US 8,184,810 B2

(12) United States Patent
Furuyama

(10) Patent No.: US 8,184,810 B2
(45) Date of Patent: May 22, 2012

(54) SECURE DEVICE AND RELAY TERMINAL

(75) Inventor: Junko Furuyama, Tokyo (JP)

(73) Assignee: Panasonic Corporation, Osaka (JP)

(*) Notice: Subject to any disclaimer, the term of this patent is extended or adjusted under 35 U.S.C. 154(b) by 1017 days.

(21) Appl. No.: 11/597,953

(22) PCT Filed: Nov. 2, 2005

(86) PCT No.: PCT/JP2005/020237
§ 371 (c)(1),
(2), (4) Date: Nov. 29, 2006

(87) PCT Pub. No.: WO2006/049224
PCT Pub. Date: May 11, 2006

(65) Prior Publication Data
US 2007/0223696 A1    Sep. 27, 2007

(30) Foreign Application Priority Data

Nov. 8, 2004   (JP) ............................... 2004-323873
Oct. 14, 2005  (JP) ............................... 2005-300832

(51) Int. Cl.
  *H04N 7/167* (2011.01)
  *G06F 11/30* (2006.01)
(52) U.S. Cl. ........ 380/239; 713/194; 713/190; 713/193; 711/101; 711/102; 711/103
(58) Field of Classification Search .......... 711/101–103; 713/190–194; 726/26–30; 380/239
See application file for complete search history.

(56) References Cited

U.S. PATENT DOCUMENTS 5,590,306 A *  12/1996  Watanabe et al. ............. 711/115
5,687,346 A    11/1997  Shinohara
5,768,617 A     6/1998  Liu
(Continued)

FOREIGN PATENT DOCUMENTS

JP          6-502271          3/1994
(Continued)

OTHER PUBLICATIONS

Paul Barham, Xen and art of visualization, sigops, ACM, Dec. 2003, University of Cambridge, UK, vol. 37 Issue 5, pp. 168-174.*

*Primary Examiner* — Nathan Flynn
*Assistant Examiner* — Viral Lakhia
(74) *Attorney, Agent, or Firm* — Wenderoth Lind & Ponack, L.L.P.

(57) ABSTRACT

An IC card includes a tamper resistant module which has one or more applications and a card control unit for controlling an operation of the IC card, a secure memory area which is accessible from only the tamper resistant module, and a contactless interface which serves to communicate with a service terminal. The card control unit generates storage instruction information, and the contactless interface transmits the storage instruction information to the service terminal. The storage instruction information contains an address of the secure memory area as a write area of data, an address of a normal memory area that indicates a save area for temporarily saving the data, an identifier of the application which executes a data movement from the normal memory area to the secure memory area, and an address of a relay terminal which relays the data.

20 Claims, 27 Drawing Sheets

U.S. PATENT DOCUMENTS

| | | | |
|---|---|---|---|
| 6,317,832 B1 * | 11/2001 | Everett et al. | 713/172 |
| 6,575,372 B1 * | 6/2003 | Everett et al. | 235/492 |
| 6,708,274 B2 * | 3/2004 | Herbert et al. | 713/190 |
| 6,854,039 B1 * | 2/2005 | Strongin et al. | 711/163 |
| 7,096,504 B1 * | 8/2006 | Tagawa et al. | 726/27 |
| 7,162,645 B2 * | 1/2007 | Iguchi et al. | 713/193 |
| 7,162,660 B2 * | 1/2007 | Ogino | 714/8 |
| 7,269,741 B2 * | 9/2007 | Matsui et al. | 713/189 |
| 7,426,644 B1 * | 9/2008 | Strongin et al. | 713/193 |
| 7,596,698 B2 * | 9/2009 | Hirota et al. | 713/172 |
| 7,814,554 B1 * | 10/2010 | Ragner | 726/27 |
| 7,822,979 B2 * | 10/2010 | Mittal | 713/164 |
| 7,870,239 B1 * | 1/2011 | Kaufman et al. | 709/223 |
| 2002/0051394 A1 * | 5/2002 | Tobita et al. | 365/221 |
| 2003/0048659 A1 | 3/2003 | Kanamori et al. | |
| 2004/0015693 A1 | 1/2004 | Kitazumi | |
| 2004/0037112 A1 * | 2/2004 | Ooishi | 365/185.09 |
| 2004/0236918 A1 * | 11/2004 | Okaue et al. | 711/164 |
| 2005/0033937 A1 * | 2/2005 | Shibuya et al. | 711/170 |
| 2005/0055610 A1 * | 3/2005 | Sassa et al. | 714/54 |
| 2005/0071662 A1 * | 3/2005 | Wada et al. | 713/193 |
| 2005/0086497 A1 * | 4/2005 | Nakayama | 713/185 |
| 2005/0259465 A1 * | 11/2005 | Yoshida et al. | 365/185.03 |
| 2006/0026340 A1 * | 2/2006 | Ito et al. | 711/103 |
| 2006/0126422 A1 * | 6/2006 | Takagi et al. | 365/232 |
| 2006/0200864 A1 * | 9/2006 | Nakanishi et al. | 726/27 |
| 2007/0014397 A1 * | 1/2007 | Ukeda et al. | 380/30 |
| 2007/0094493 A1 * | 4/2007 | Ali et al. | 713/156 |
| 2007/0113079 A1 * | 5/2007 | Ito et al. | 713/166 |

FOREIGN PATENT DOCUMENTS

| | | |
|---|---|---|
| JP | 8-95715 | 4/1996 |
| JP | 8-101751 | 4/1996 |
| JP | 2000-40138 | 2/2000 |
| JP | 2002-124960 | 4/2002 |
| JP | 2003-85034 | 3/2003 |

* cited by examiner

| DATA SIZE | TRANSMISSION DESTINATION INFORMATION | COUNTERMEASURE IN CASE OF ERROR |
|---|---|---|
| LESS THAN 100 KB | blt://DEVICE ADDRESS OF PORTABLE TERMINAL | SAVE DATA IN NORMAL MEMORY WITHIN CARD |
| EQUAL TO OR GREATER THAN 100 KB AND LESS THAN 100 MB | http://DEVICE ADDRESS OF HOME SERVER | SAVE DATA IN NORMAL MEMORY |
| GREATER THAN 100 MB | http://DEVICE ADDRESS OF HOME SERVER | DELETE DATA |

FIG. 5

| DATA TYPE | TRANSMISSION DESTINATION INFORMATION | COUNTERMEASURE IN CASE OF ERROR |
|---|---|---|
| .jpg | blt://DEVICE ADDRESS OF PORTABLE TERMINAL | SAVE DATA IN NORMAL MEMORY WITHIN CARD |
| .mpg | DEVICE ADDRESS OF TV HAVING BUILT-IN HDD | SAVE DATA IN NORMAL MEMORY |
| .exe | DEVICE ADDRESS OF PC | DELETE DATA |

FIG. 6

| TRANSMISSION DESTINATION INFORMATION | CARD APPLICATION ID | STORAGE AREA ADDRESS | SAVE AREA IN CASE OF ERROR | DATA SIZE |
|---|---|---|---|---|
| blt://DEVICE ADDRESS OF PORTABLE TERMINAL | abc12345 | SECURE MEMORY AREA: ADDRESS 1001 | NORMAL MEMORY AREA: ADDRESS 5001 | 10KB |

FIG. 7

| COMMUNICATION METHOD | TRANSMISSION DESTINATION INFORMATION |
|---|---|
| INFRARED RADIATION | irda://DEVICE ADDRESS |
| IP | http://DEVICE ADDRESS |
| FILE TRANSFER | ftp://DEVICE ADDRESS |

FIG. 8

| CARD APPLICATION ID | DATA NAME | STORAGE AREA ADDRESS | SAVE AREA IN CASE OF ERROR | DATA SIZE |
|---|---|---|---|---|
| abc12345 | abc.jpg | SECURE MEMORY AREA: ADDRESS 1001 | NORMAL MEMORY AREA: ADDRESS 5001 | 10KB |

FIG. 9

| Tag | CONTENT |
|---|---|
| 0x01 | TERMINAL MW ID |
| 0x02 | STORAGE INSTRUCTION INFORMATION |
| 0x03 | SESSION ID |
| 0x04 | DATA ID |
| 0x05 | R/W ID |

0x03, 0x04, 0x05: OPTIONAL

FIG. 11B

SECURE DEVICE AND RELAY TERMINAL

TECHNICAL FIELD

The present invention relates to a secure device which has a tamper-resistant area, and a relay terminal which writes data into a secure device.

BACKGROUND ART

Heretofore, a method employing an IC card, for example, has been adopted as a method which securely stores digital contents. The IC card includes a secure memory area which is accessible from only a tamper resistant module and which cannot be read out by unauthorized means. Since, however, the secure memory area has been small in capacity, the digital contents to be protected have been encrypted, with a decrypting key stored in the secure memory area, and the encrypted digital contents have been stored in the normal memory area of a terminal or in a memory card. In case of adopting such a storage aspect, the key for decrypting the digital contents is distributed to the secure memory by employing an encryption communication channel, and the encrypted digital contents are distributed to the normal memory area later, as disclosed in JP-A-2002-124960 by way of example.

With the enlargement of the capacity of the memory of an IC card in recent years, it has been highly desired to store digital contents themselves in a secure memory. However, data received from outside cannot be directly written into the secure memory area, and this secure memory area is accessible from only a tamper resistant module. Accordingly, in a case where the tamper resistant module is performing any other process of high load, or the like, the distributed information might fail to be retained.

With the intention of preventing such a drawback, there is considered a procedure in which, in a case where the tamper resistant module is performing any other process, that is, when it is in a busy state, the data are temporarily retained in a relay terminal, whereupon the temporarily retained data are moved to the secure memory through the tamper resistant module at a suitable timing.

With this procedure, however, when the IC card is moved to a different card reader/writer, the temporarily retained data cannot be moved to the secure memory being the final storage area. It cannot be grasped, either, that the data retained in the card reader/writer are the temporarily retained data.

It increases the load of the card reader/writer and is also problematic on security that the card reader/writer keeps storing the information which is to be transferred to the tamper resistant module.

SUMMARY OF THE INVENTION

In view of the above background, the present invention has the object to provide a secure device and a relay terminal which can write data into a secure memory area safely and reliably irrespective of the situation of a tamper resistant module.

[Means For Solving The Problems]

In an aspect of the present invention, a secure device which receives data transmitted from a service terminal, through a relay terminal having an information writing function, comprises: a tamper resistant module including at least one application, and a device control unit for controlling an operation of the secure device; a secure memory which is accessible from only the tamper resistant module; and a communication unit for communicating with the service terminal; wherein the device control unit generates and stores storage instruction information including an address of the secure memory that indicates a write area of the data, and information on a countermeasure in a case where the data could not be written into the secure memory; and the communication unit transmits the storage instruction information to the service terminal.

In another aspect of the present invention, the information on the countermeasure may include an address of an (not secured) normal memory of the secure device or the relay terminal that indicates a save area for temporarily saving the data, and an identifier of the application which moves the data saved in the normal memory to the secure memory.

In another aspect of the present invention, the information on the countermeasure may include a storage area reservation term indicating a term for which at least either the save area for temporarily saving the data or the memory area for the write area of the data is kept reserved.

In another aspect of the present invention, the communication unit of the secure device may receive attribute information of the data which are transmitted from the service terminal; and the device control unit determines the relay terminal which relays the data to be transmitted from the service terminal, on the basis of the attribute information, and the device control unit includes an address of the determined relay terminal in the storage instruction information.

In another aspect of the present invention, the communication unit of the secure device may receive attribute information of the data which are transmitted from the service terminal; and the device control unit determines a communication method between the relay terminal and the service terminal, on the basis of the attribute information, and the device control unit includes the communication method in the storage instruction information.

In another aspect of the present invention, a relay terminal which writes data transmitted from a service terminal, into a secure device connected communicably, comprises: a data reception unit for receiving from the service terminal, the data, and storage instruction information; wherein the storage instruction information includes an address of a secure memory of the secure device that indicates a write area of the data, and information on a countermeasure in a case where the data could not be written into the secure memory; a command transmission unit for transmitting a command for writing the received data into the address of the secure memory as designated by the storage instruction information to the secure device, and for receiving a response to the command, from the secure device; and a control unit for judging propriety of the data write into the secure memory, on the basis of the response, and for writing the data into a normal memory of the secure device or the relay terminal, on the basis of the information on the countermeasure designated by the storage instruction information, in case of a judgment that the write is impossible.

In another aspect of the present invention, a relay terminal which writes data transmitted from a service terminal into a secure device connected communicably, comprises: a data reception unit for receiving from the service terminal, the data, and storage instruction information that includes an address of a secure memory of the secure device that indicates a write area of the data, and information on a countermeasure in a case where the data could not be written into the secure memory; and a control unit for managing a processing state of the secure device to judge propriety of the data write into the secure memory on the basis of the processing state, and for writing the data into a normal memory of the secure device or the relay terminal on the basis of the information on the countermeasure designated by the storage instruction information, in case of a judgment that the write is impossible.

In another aspect of the present invention, the relay terminal may further comprise a deletion unit for deleting the storage instruction information after completion of the write of the data into the address of the normal memory designated by the storage instruction information.

In another aspect of the present invention, the information on the countermeasure may contain an address of a normal memory of the secure device or the relay terminal that indicates a save area for temporarily saving the data, and an identifier of an application which moves the data saved in the normal memory to the secure memory.

In another aspect of the present invention, the information on the countermeasure may include a storage area reservation term indicating a term for which at least either the save area for temporarily saving the data or the memory area being the write area of the data is kept reserved.

In another aspect of the present invention, the instruction transmission unit of the relay terminal may send an activation command to the application corresponding to the application identifier, on the basis of the identifier of the application as designated by the storage instruction information; and the instruction transmission unit sends to the activated application, a data movement command for moving the data temporarily saved in the normal memory, to the address of the secure memory.

In another aspect of the present invention, the instruction transmission unit of the relay terminal may send an activation command to the application corresponding to the application identifier, on the basis of the identifier of the application as designated by the storage instruction information; and the activated application moves the data temporarily saved in the normal memory, to the address of the secure memory, by referring to the storage instruction information.

In another aspect of the present invention, the relay terminal may further comprise a data readout unit for accessing the address of the normal memory designated by the storage instruction information, so as to read out the data temporarily saved in the normal memory; wherein the instruction transmission unit sends an activation command to the application corresponding to the application identifier, on the basis of the identifier of the application as designated by the storage instruction information; and the instruction transmission unit sends to the activated application, a write command for instructing the application to write the data read out by the data readout unit, into the address of the secure memory.

In another aspect of the present invention, a method of performing a secure device wherein data transmitted from a service terminal are received through a relay terminal having an information writing function, comprises the step that the secure device generates a storage instruction information including an address of a secure memory of the secure device that indicates a write area of the data, and information on a countermeasure in a case where the data could not be written into the secure memory; and the step that the secure device transmits the storage instruction information to the service terminal. In another aspect of the present invention, a program which serves to receive data transmitted from a service terminal, through a relay terminal having an information writing function, and which is readable by a secure device, the program causing the secure device to execute the step of generating a storage instruction information including an address of a secure memory of the secure device that indicates a write area of the data, and information on a countermeasure in a case where the data could not be written into the secure memory; and the step of transmitting the storage instruction information to the service terminal.

As will be described below, other aspects exist in the present invention. Accordingly, this disclosure of the invention is intended to provide some of the aspects of the invention, and it is not intended to limit the claimed scope of the invention.

BRIEF DESCRIPTION OF THE DRAWINGS

FIG. 5 is a diagram showing an example of a table for use in the determination of a transmission destination.

FIG. 6 is a diagram showing an example of a table for use in the determination of a transmission destination.

FIG. 7 is a diagram showing an example of the storage instruction information.

FIG. 8 is a diagram showing an example of transmission destination information which is contained in the storage instruction information.

FIG. 9 is a diagram showing an example of the storage instruction information.

FIG. 11B is a diagram showing the contents of a header.

DETAILED DESCRIPTION OF THE INVENTION

Figure 1:
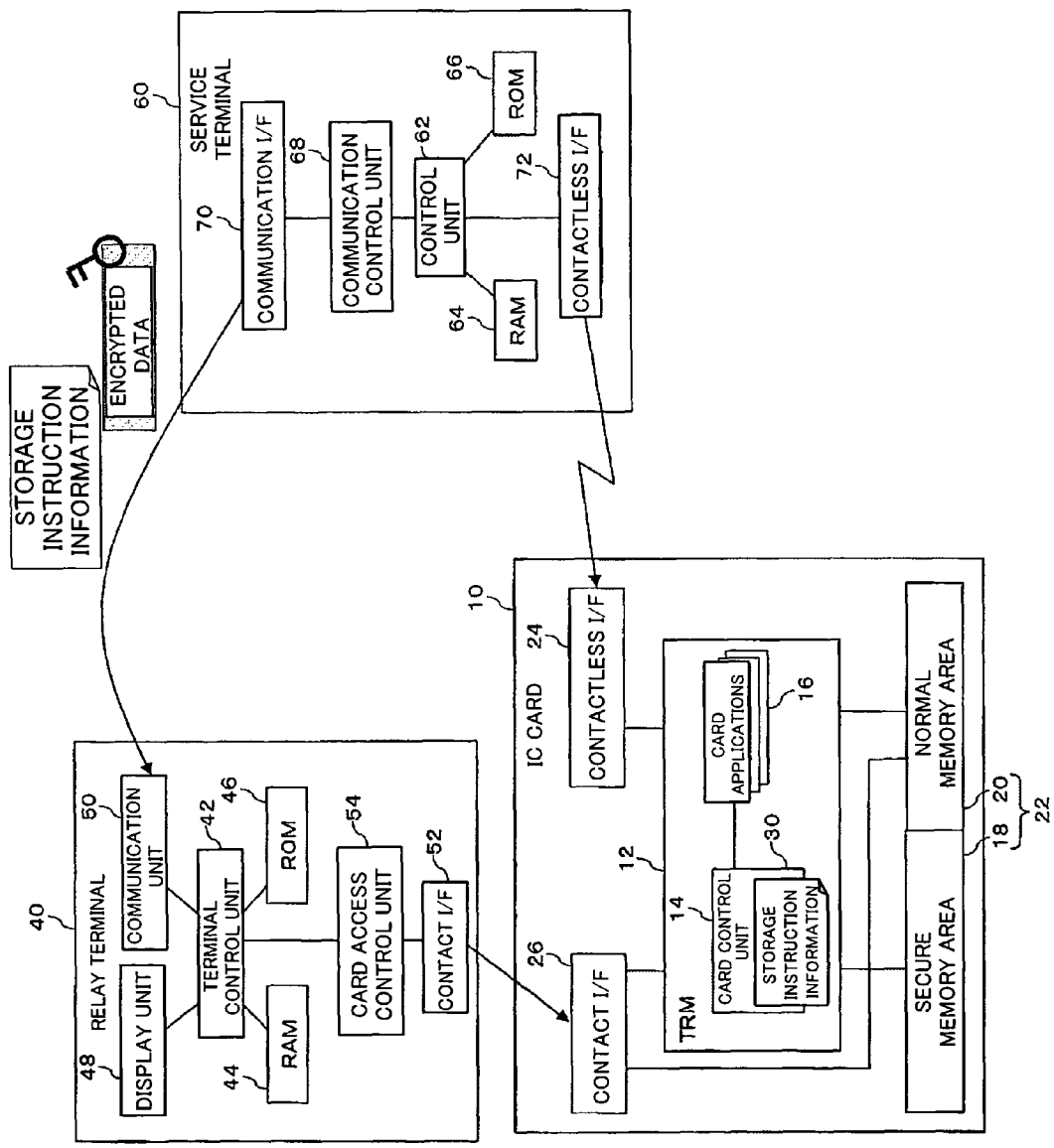
FIG. 1 is a diagram showing the configuration of an IC card system in a first embodiment.

The detailed description of the present invention will be given below. The following detailed description and the accompanying drawings, however, shall not restrict the invention. The scope of the invention shall be defined by the appended claims.

The secure device of an embodiment which receives data transmitted from a service terminal through a relay terminal having an information writing function, comprises a tamper resistant module including at least one application, and a device control unit for controlling an operation of the secure device; a secure memory which is accessible from only the tamper resistant module; and a communication unit for communicating with the service terminal; wherein the device control unit generates and stores storage instruction information including an address of the secure memory that indicates a write area of the data, and information on a countermeasure in a case where the data could not be written into the secure memory; and the communication unit transmits the storage instruction information to the service terminal.

The storage instruction information is generated and is transmitted to the service terminal in this manner, whereby the data can be received through the relay terminal designated by the secure device. The information on the countermeasure in the case where the write was impossible is contained in the storage instruction information, whereby when the data cannot be written into the secure memory, the secure device can take the step of retaining the received data in a predetermined location as an emergency measure, by referring to the information on the countermeasure.

The information on the countermeasure in the case where the write was impossible may include an address of a normal memory of the secure device or the relay terminal that indicates a save area for temporarily saving the data, and an identifier of the application which moves the data saved in the normal memory to the secure memory.

That address of the normal memory which serves to temporarily save the data is contained, whereby when the data cannot be written into the secure memory, they can be once written into the normal memory. Accordingly, after the data write into the secure memory has become possible, the data write into the secure memory can be executed by reading the data out of the normal memory. Thus, even in a state where the data cannot be written into the secure memory temporarily, they can be reliably written into the secure memory.

The information on the countermeasure in the case where the write was impossible may include a storage area reservation term indicating a term for which at least either the save area for temporarily saving the data or the memory area for the write area of the data is kept reserved.

Owing to the inclusion of the reservation term of the memory, the memory in which the data are not stored even after the expiration of the term can be released to prevent a memory capacity from decreasing for the reason that the memory area is inappropriately kept reserved.

In the secure device, the communication unit may receive attribute information of the data which are transmitted from the service terminal; and that the device control unit determines the relay terminal which relays the data to be transmitted from the service terminal, on the basis of the attribute information, and that the device control unit may include an address of the determined relay terminal in the storage instruction information.

Owing to this configuration, the appropriate relay terminal can be determined in accordance with the attribute information received from the service terminal. Here, the "attribute information" includes, for example, the data quantity and extension code of the data to be transmitted, and the sort of the relay terminal. For example, in accordance with the attribute of the data quantity, a domestic PC is determined as the relay terminal when the data quantity is large, and a portable terminal is determined as the relay terminal when the data quantity is small. Thus, in case of the large data quantity, it is possible to avoid the inconvenience that a process in the portable terminal cannot be executed before all the data are received.

In the secure device, the communication unit may receive attribute information of the data which are transmitted from the service terminal; and that the device control unit may determine a communication method between the relay terminal and the service terminal, on the basis of the attribute information, and that the device control unit may include the communication method in the storage instruction information.

Owing to this configuration, the appropriate communication method can be determined in accordance with the attribute information received from the service terminal.

The relay terminal of an embodiment which writes data transmitted from a service terminal into a secure device connected communicably comprises a data reception unit for receiving the data, and storage instruction information; wherein the storage instruction information includes an address of a secure memory of the secure device that indicates a write area of the data, and information on a countermeasure in a case where the data could not be written into the secure memory; a command transmission unit for transmitting a command for writing the received data into the address of the secure memory as designated by the storage instruction information, to the secure device, and for receiving a response to the command, from the secure device; and a control unit for judging propriety of the data write into the secure memory, on the basis of the response, for writing the data into a normal memory of the secure device or the relay terminal, on the basis of the information on the countermeasure designated by the storage instruction information, in case of a judgment that the write is impossible.

In this manner, when the data cannot be written into the secure memory, they are written into the normal memory, whereby when the data write into the secure memory has become possible later, the data can be moved from the normal memory to the secure memory. Thus, even in a state where the data cannot be written into the secure memory temporarily, they can be reliably written into the secure memory.

The relay terminal of an embodiment which writes data transmitted from a service terminal into a secure device connected communicably comprises a data reception unit for receiving from the service terminal, the data, and storage instruction information that includes an address of a secure memory of the secure device that indicates a write area of the data, and information on a countermeasure in a case where the data could not be written into the secure memory; and a control unit for managing a processing state of the secure device to judge propriety of the data write into the secure memory, on the basis of the processing state, and for writing the data into a normal memory of the secure device or the relay terminal, on the basis of the information on the countermeasure designated by the storage instruction information, in case of a judgment that the write is impossible.

In this manner, the control unit is managing the processing state of the secure device, and it writes the data into the normal memory in the case where it has judged that the write is impossible, on the basis of the processing state, whereby when the data write into the secure memory has become possible later, the data can be moved from the normal memory to the secure memory. Thus, even in a state where the data cannot be written into the secure memory temporarily, they can be reliably written into the secure memory.

The relay terminal of the embodiment is configured comprising a deletion unit for deleting the storage instruction information after completion of the write of the data into the address of the normal memory designated by the storage instruction information.

Thus, a risk at which the storage instruction information is illegally read out from the relay terminal can be reduced, and a security can be enhanced.

The information on the countermeasure may contain an address of a normal memory of the secure device or the relay terminal that indicates a save area for temporarily saving the data, and an identifier of an application which moves the data saved in the normal memory to the secure memory.

Thus, the address of the normal memory for temporarily saving the data is contained, whereby when the data cannot be written into the secure memory, they can be once written into the normal memory. Accordingly, after the data write into the secure memory has become possible, the data write into the secure memory can be executed by reading the data out of the normal memory. Thus, even in a state where the data cannot be written into the secure memory temporarily, they can be reliably written into the secure memory.

The information on the countermeasure may contain a storage area reservation term indicating a term for which at least either the save area for temporarily saving the data or the memory area for the write area of the data is kept reserved.

Thus, the memory in which the data are not read out even after the expiration of the term can be released to prevent a memory capacity from decreasing for the reason that the memory area is inappropriately kept reserved.

In the relay terminal, the instruction transmission unit may send an activation command for the application corresponding to the application identifier, on the basis of the identifier of the application as designated by the storage instruction information; and that the instruction transmission unit may send to the activated application, a data movement command for moving the data temporarily saved in the normal memory, to the address of the secure memory.

In this manner, the command for moving the data from the normal memory to the secure memory is transmitted to the secure device, together with the identifier of the application as designated by the storage instruction information read out of the secure device, whereby the secure device can read out the data from the normal memory and then store the read-out data in the secure memory. Thus, the data temporarily saved in the normal memory can be moved to the secure memory.

In the relay terminal, the instruction transmission unit may send an activation command for the application corresponding to the application identifier, on the basis of the identifier of the application as designated by the storage instruction information; and that the activated application moves the data temporarily saved in the normal memory to the address of the secure memory, by referring to the storage instruction information.

In this manner, the identifier of the application as designated by the storage instruction information read out of the secure device is transmitted to the secure device, whereby the secure device activates the designated application. Besides, the activated application reads out the data stored in the normal memory and then stores the data in the secure memory, by referring to the storage instruction information held in the secure device itself, so that the data temporarily saved in the normal memory can be moved to the secure memory.

The relay terminal may further comprise a data readout unit for accessing the address of the normal memory designated by the storage instruction information, so as to read out the data temporarily saved in the normal memory; wherein the instruction transmission unit sends an activation command to the application corresponding to the application identifier, on the basis of the identifier of the application as designated by the storage instruction information; and the instruction transmission unit may send to the activated application, a write command for instructing the application to write the data read out by the data readout unit, into the address of the secure memory.

In this manner, the data stored in the normal memory are read out on the basis of the address of the normal memory designated by the storage instruction information read out of the secure device, and the command for writing the data into the secure memory is transmitted to the secure memory, together with the read-out data, whereby the data temporarily saved in the normal memory can be moved to the secure memory.

A method of performing a secure device in an embodiment which receives data transmitted from a service terminal through a relay terminal having an information writing function comprises the step that the secure device generates a storage instruction information including an address of a secure memory of the secure device that indicates a write area of the data, and information on a countermeasure in a case where the data could not be written into the secure memory; and the step that the secure device transmits the storage instruction information to the service terminal.

Owing to this configuration, as in the secure device of the embodiment, even in a state where the data cannot be written into the secure memory temporarily, they can be reliably written into the secure memory on the basis of the storage instruction information. It is also possible to apply the various configurations of the secure device of the embodiment to the method of operating the secure device in the embodiment.

The program of an embodiment for operating the secure device which serves to receive data transmitted from a service terminal, through a relay terminal having an information writing function, the program causing the secure device to execute the step of generating a storage instruction information including an address of a secure memory that indicates a write area of the data, and information on a countermeasure in a case where the data could not be written into the secure memory; and the step of transmitting the storage instruction information to the service terminal.

Owing to this configuration, as in the secure device of the embodiment, even in a state where the data cannot be written into the secure memory temporarily, they can be reliably written into the secure memory on the basis of the storage instruction information. It is also possible to apply the various configurations of the secure device of the embodiment to the program of the embodiment.

Now, secure devices and relay terminals embodying the present invention will be described with reference to the drawings. In the following description, an IC card system in which data are transmitted from a service terminal 60 to a relay terminal 40 and in which the relay terminal 40 writes the data into an IC card 10 as a secure device will be described. This system operates in a flow stated below. The purchase of contents is determined by the communications between the service terminal 60 and the IC card 10, and the purchased contents data to be handled are distributed from the service terminal 60 to the relay terminal 40. Besides, the relay terminal 40 stores the contents data in the secure memory area 18 of the IC card 10.

FIG. 1 is a diagram showing an IC card system which includes an IC card and a relay terminal in the first embodiment of the invention. The IC card system is provided with the IC card 10, a service terminal 60 which offers information to the IC card 10, and the relay terminal 40 which writes the information into the IC card 10.

The IC card 10 is provided with a tamper resistant module hereafter termed "TRM") 12, and a memory 22 which includes a secure memory area 18 and a normal memory area 20. The secure memory area 18 is an area which is accessible only by the TRM 12. The normal memory area 20 is an area which is accessible from the TRM 12 and a contact interface 26.

The TRM 12 includes a card control unit 14 which controls the operation of the IC card 10, and one or more card applications 16. The hardware of the TRM 12 is a single module which is provided with a CPU and a ROM. The card applications 16 are stored in the ROM, and the CPU reads out the card application 16 from the ROM and executes this card application, thereby to control the operation of the IC card 10.

The IC card 10 has a contactless interface 24 and the contact interface 26. In this embodiment, communications with the service terminal 60 are performed by the contactless interface 24, and communications with the relay terminal 40 are performed by the contact interface 26.

The contact interface 26 is connected to the TRM 12 and the normal memory area 20. This contact interface 26 accesses the normal memory area 20 in a case where contact interface 26 has received a memory access command from outside, and contact interface 26 accesses the secure memory area 18 through the TRM 12 in a case where contact interface 26 has received an IC card access command. The memory access command is always received by the contact interface 26, whereas the IC card access command is not received in a case where the IC card 10 is in a busy state, and the contact interface 26 returns an error to a contact interface 52. Examples of the busy state of the IC card 10 are a case where the contactless interface 24 is executing any process in the IC card 10 in which this contactless interface 24 and the contact interface 26 cannot operate simultaneously, and a case where any other process is proceeding in the IC card 10 of single channel.

Apart from the aspect in which the busy state is sensed by sending the IC card access command to the IC card 10 and then receiving the error, the card access control unit 54 of the relay terminal 40 may manage that the IC card 10 is under the start of a contactless process and under the start of a contact process, in order that when either of the processes is proceeding, the card access control unit 54 may stop to transmit a request for the start of the other communication process to the IC card 10. Also in a case where connections are extended up to the maximum number of channels during the contact process, a the card access control unit 54 may judge a busy state so as to prevent a further access request from being transmitted to the IC card 10.

The contactless interface 24 is connected to the TRM 12. This contactless interface 24 transmits information inputted from outside, to the TRM 12, and the contactless interface 24 transmits information delivered from the TRM 12, to outside. Examples of the contactless interface 24 are an interface of Type A or Type B of ISO/IEC 14443, JICSAP 2.0, infrared communications, or the Bluetooth. In the example shown in FIG. 1, the contactless interface 24 is assumed to provide within the IC card 10, but this is not restrictive, and part or the whole of a contactless interface may provide on the side of the relay terminal 40, whereby the IC card 10 performs contactless communications with the service terminal 60 through the contact interfaces 26 and 52.

The relay terminal 40 is provided with the contact interface 52 and card access control unit 54 for reading and writing the information of the IC card 10, in addition to the configuration of a terminal control unit 42, a RAM 44, a ROM 46, a display unit 48 and a communication unit 50 with which a general computer is provided. Examples of the relay terminal 40 are a portable terminal with a portable telephone function, an Internet-connected PC or an Internet-connected TV.

The service terminal 60 is provided with a contactless interface 72 for performing radio communications with the IC card 10, in addition to the configuration of a control unit 62, a RAM 64, a ROM 66, a communication control unit 68 and a communication interface 70 with which a general computer is provided. Contents data to be transmitted to the IC card 10 are stored in the ROM 66 of the service terminal 60.

Next, the operation of the IC card system in the first embodiment will be described. The operation in the case where the IC card 10 is not busy and where data can be normally written into the secure memory area 18 will be initially described, followed by the operation in the case where the TRM 12 is busy.

Figure 2:
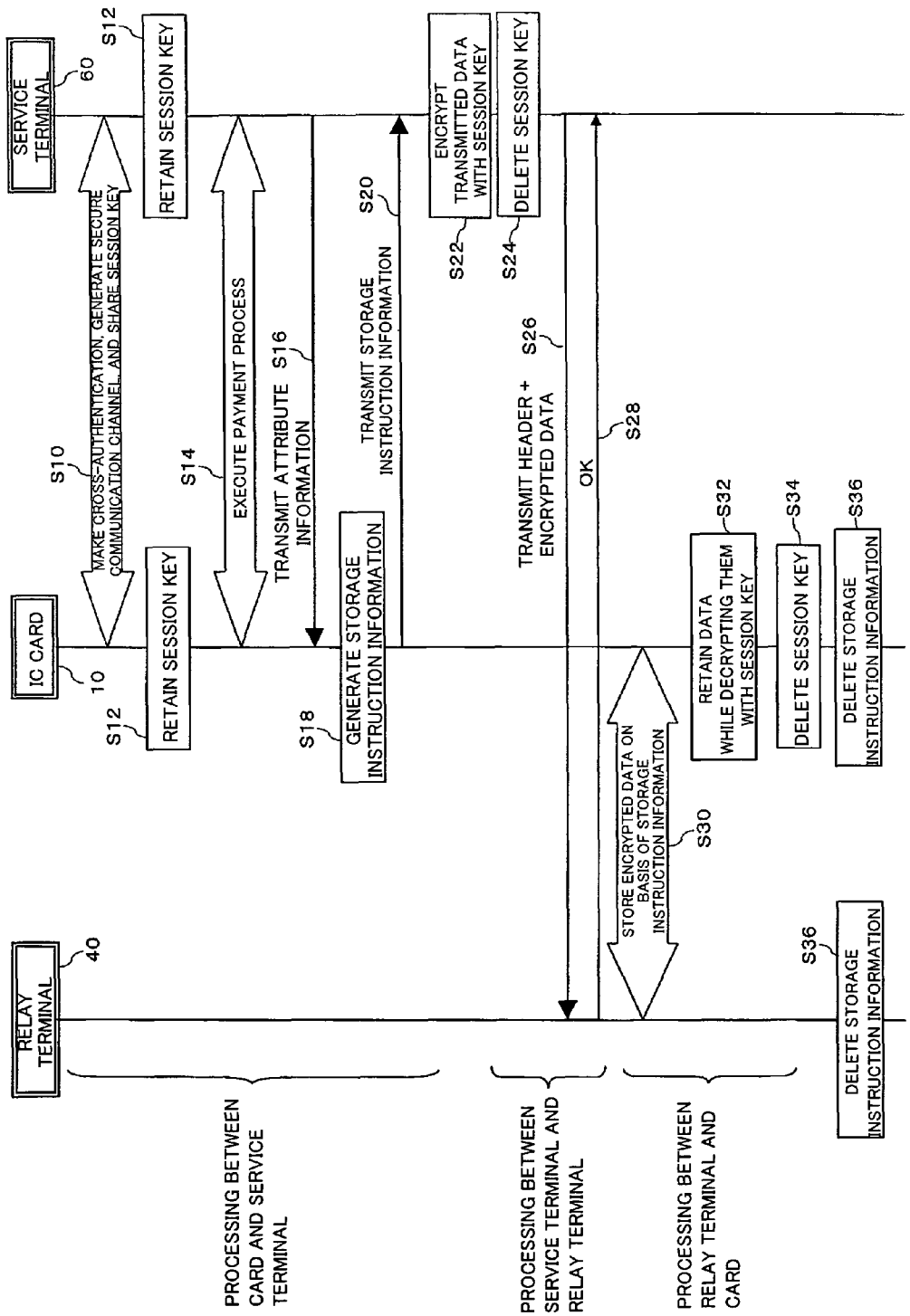
FIG. 2 is a diagram showing the outline of the operation of the IC card system in the first embodiment.

FIG. 2 is a diagram showing the flow of data which are transmitted and received among the IC card 10, service terminal 60 and relay terminal 40. First, contactless communications are performed between the IC card 10 and the service terminal 60, thereby to establish a session (S10).

Figure 3:
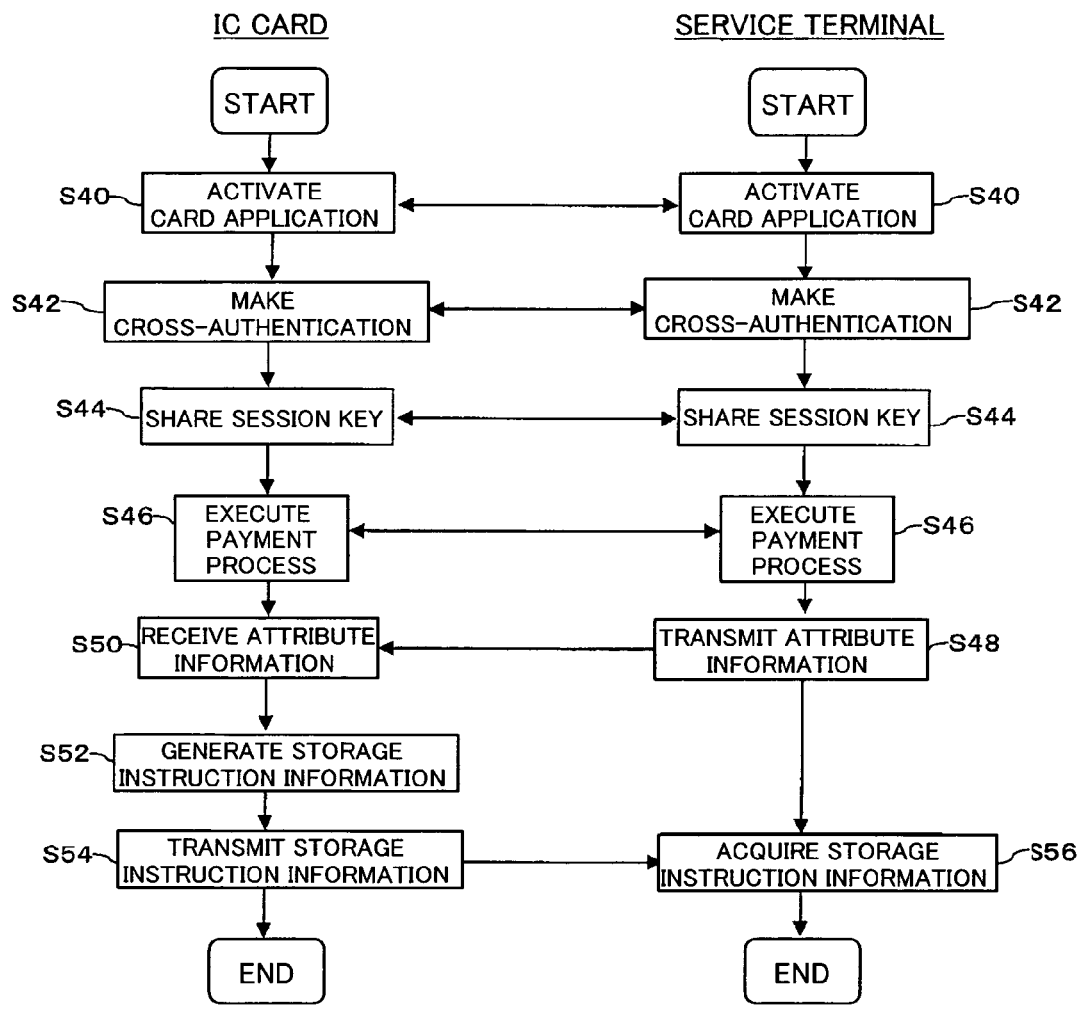
FIG. 3 is a diagram showing the details of the processes of an IC card and a service terminal.

FIG. 3 is a diagram showing the processes of the IC card 10 and the service terminal 60 in detail. First, the IC card 10 and the service terminal 60 activate the card application 16 (S40). Thereafter, a cross-authentication is made between the IC card 10 and the service terminal 60 (S42), a secure communication channel is generated so as to share a session key (S44). Owing to the operations thus far described, processing up to the retention of the common session key as shown in FIG. 2 proceeds in the IC card 10 and the service terminal 60 (S12).

Subsequently, as shown in FIG. 3, a payment process is executed between the IC card 10 and the service terminal 60 (S46). Here, the IC card 10 transmits a purchase request for contents data to the service terminal 60, and the service terminal 60 determines the distribution of the contents data according to the purchase request. Thus, the payment process of the purchase of the contents data is executed between the IC card 10 and the service terminal 60. Then, the service terminal 60 transmits the attribute information of the contents data to the IC card 10 (S48).

When the IC card 10 receives the attribute information transmitted from the service terminal 60 (S50), the IC card 10 generates storage instruction information 30 on the basis of the received attribute information (S52). Here, the storage instruction information 30 generated by the IC card 10 will be described.

Figure 4:
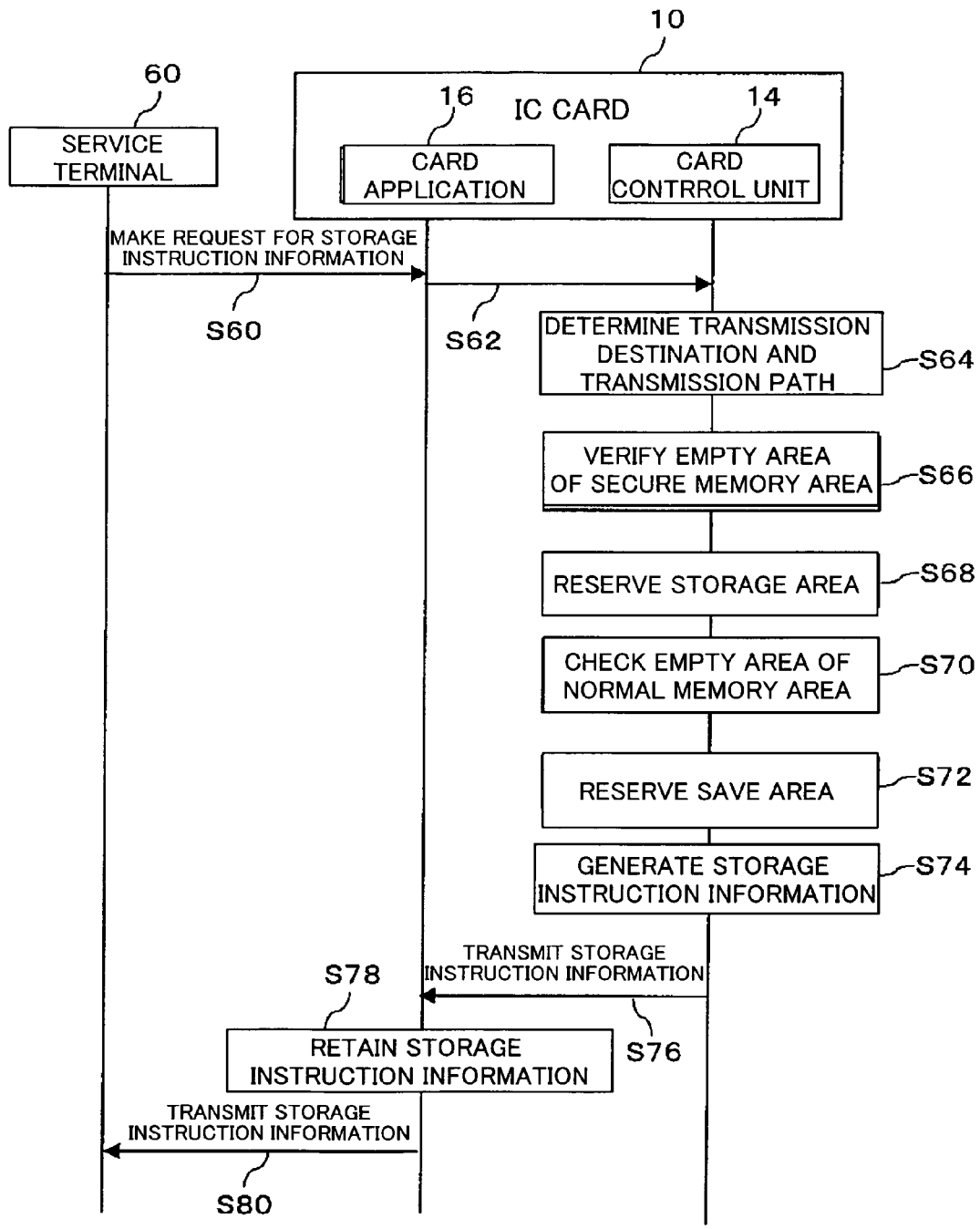
FIG. 4 is a diagram showing the operation of the generation of storage instruction information.

FIG. 4 is a diagram showing an operation by which the IC card 10 generates the storage instruction information 30 and transmits the information 30 to the service terminal 60. First, the service terminal 60 transmits the attribute information of the data to the IC card 10 (S60). Examples of the attribute information of the data are a data quantity, a data type, etc. When the card application 16 of the IC card 10 receives the attribute information transmitted from the service terminal 60, the card application 16 delivers the received attribute information to the card control unit 14 (S62). The card control unit 14 determines the transmission destination and transmission path of the data which are to be transmitted from the service terminal 60, on the basis of the attribute information (S64). The processing of the card control unit from the step S64 to a step S74 may be built in a card OS in the form of a library, or it may be held in the TRM in the form of a card application.

FIG. 5 is a diagram showing an example of a table which the card control unit holds in order to determine a transmission destination and a temporary save area in the case of a write error when a data size has been received as the attribute information. As shown in FIG. 5, the table has transmission destination information and information indicating a countermeasure against the error, in association with the data size. In the table shown in FIG. 5, the device address of a portable terminal is designated as the relay terminal in a case where the data size is less than 100 KB, while the device address of a home server is designated as the relay terminal in a case where the data size is equal to or greater than 100 KB. Thus, the small quantity of data can be received and smoothly utilized by the portable terminal, and the large quantity of data are permitted to be received by the home server of large storage capacity. Regarding the countermeasure against the error, the data less than 100 KB are designated to be saved in the normal memory area 20 within the IC card 10. Thus, the oppression of the memory of the portable terminal is avoidable. Data which are equal to or greater than 100 KB and less than 100 MB, are designated to be saved in the normal memory of the home server. Thus, the normal memory of the home server which is generally large in capacity can be utilized as a temporary save area. In this manner, using the table shown in FIG. 5, the appropriate transmission destination and temporary save area can be determined in accordance with the data size. Two or more countermeasures against each error may be designated. For example, the save of the data into the normal memory area 20 within the IC card 10 is designated as the first countermeasure, and the save of the data into the normal memory area within the relay terminal 40 is designated as the second countermeasure. In this way, even in a case where the IC card is not inserted in the relay terminal, the data can be temporarily retained in the normal memory within the relay terminal 40 by the second countermeasure. The attribute information which is received from the service terminal 60 is not restricted to the data size, but the data type, for example, may be received as the attribute information. In this case, for example, a table as shown in FIG. 6 is included, and a transmission destination is determined in accordance with the data type.

Regarding the countermeasure in the case of the error, after the verification of an empty memory area (S66, S68, S70 and S72 in FIG. 4), the temporary save area may be dynamically determined in accordance with the empty state of the memory area by the card control unit 14 of the IC card 10. In that case, the column of the countermeasure in the case of the error may be omitted in each of the tables in FIGS. 5 and 6.

As shown in FIG. 4, after having determined the transmission destination, the card control unit 14 verifies the empty area of the secure memory area 18 (S66) and reserves the storage area of the data (S68). Thus, other data can not be written into the reserved area for storing the data, and these data can be reliably stored in the secure memory area 18. Subsequently, the card control unit 14 checks an empty area in the normal memory area 20 (S70) and reserves the area of the temporary save area of the data (S72). Thus, other data can not be written into the reserved area for the temporary save, and the data can be reliably saved in the normal memory area 20 even in a case where the IC card 10 is in the busy state, so the data cannot be stored in the secure memory area 18. Regarding the normal memory area 20 for the temporary save area of the data, however, these data may be written into an empty area without designating a write area or reserving a memory area. That is, the step 72 may be omitted. Next, the card control unit 14 creates the storage instruction information 30 (S74).

FIG. 7 is a diagram showing an example of the storage instruction information 30. As shown in FIG. 7, the storage instruction information 30 contains the information items of "transmission destination information", "card applicationID", "storage area address", "save area in the case of an error" and "data size". The transmission destination information is the address of a transmission destination determined at the step of the transmission destination. In the example shown in FIG. 7, the transmission destination information contains, not only the device address of a portable terminal which is the relay terminal of the transmission destination, but also information "blt" which indicates that a communication method is the Bluetooth. In cases where communication methods are infrared radiation, IP and file transfer, information items shown in FIG. 8 are respectively contained in the transmission destination information. The card application ID is information identifying the card application 16 which executes the reception process of the data. The storage area address is in formation indicating the address of the area of the storage area which has been reserved at the step S68. The save area in the case of an error is information indicating the address of the area of the save area which has been reserved at the step S72. The data size is information indicating the data size of the reserved area. When the save area in the case of the error is not reserved, the save area in the case of an error is designated only as the normal memory area.

The storage instruction information 30 may further contain "storage area reservation term". The "storage area reservation term" is the date and hour indicating a term for which the area reserved at the steps S68 and S72 is kept reserved.

As shown in FIG. 4, the card control unit 14 of the IC card 10 transmits the created storage instruction information 30 to the card application 16 (S76). The card application 16 retains the received storage instruction information 30, and transmits this storage instruction information 30 to the service terminal 60 (S78 and S80). As shown in FIG. 9, the storage instruction information 30 which is retained in the IC card 10 need not contain the transmission destination information. The transmission destination information is information for grasping the relay terminal 40 to which the service terminal 60 is to transmit the data, so that it need not be contained in the data which are transmitted from the service terminal 60 to the relay terminal 40. Thus far, the storage instruction information has been described.

As shown in FIG. 3, the IC card 10 transmits the storage instruction information 30 to the service terminal 60 (S54). The service terminal 60 receives the storage instruction information 30 transmitted from the IC card 10, whereby the communications between the IC card 10 and the service terminal 60 are completed (S56).

As shown in FIG. 2, when the service terminal 60 receives the storage instruction information 30 transmitted from the IC card 10 (S20), the service terminal 60 transmits the contents data requested by the IC card 10, to the relay terminal 40 designated by the storage instruction information 30 (S22-S28).

Figure 10:
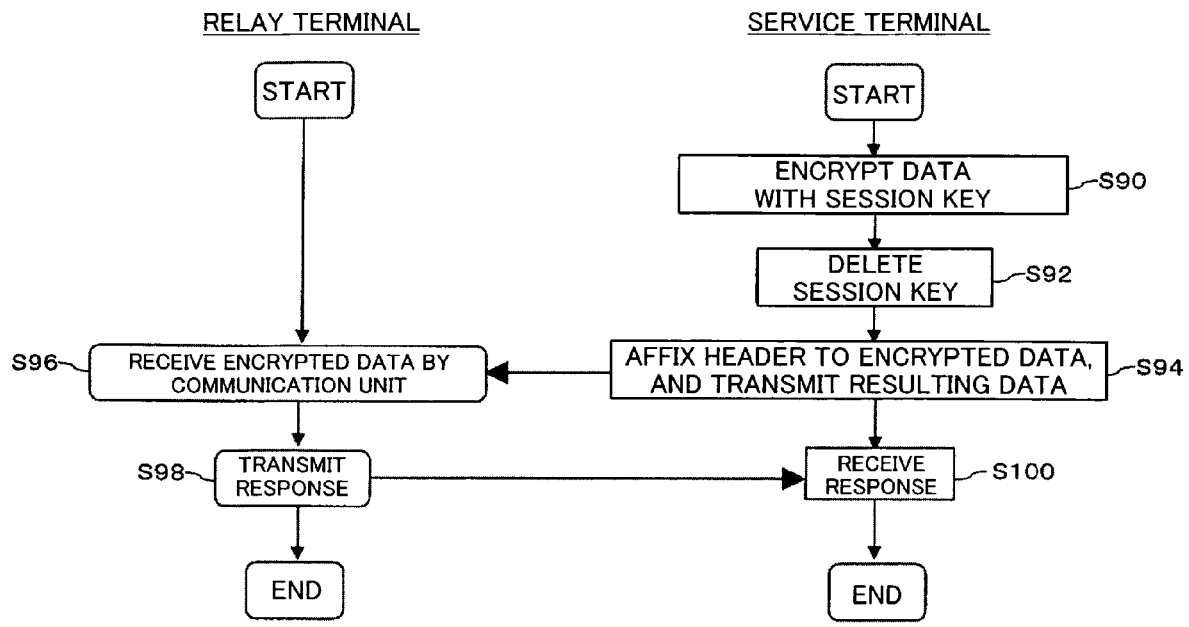
FIG. 10 is a diagram showing the processes of a relay terminal and the service terminal.

FIG. 10 is a diagram showing the processes of the service terminal 60 and relay terminal 40 in detail. First, the service terminal 60 encrypts the data to-be-transmitted with the session key, thereby to generate encrypted data (S90). When the encryption ends, the service terminal 60 deletes the session key used in the encryption (S92). Subsequently, the service terminal 60 affixes a header to the encrypted data and transmits these data to the relay terminal 40 (S94).

Figure 11A:
FIG. 11A is a diagram showing the format of data which are transmitted from the service terminal to the relay terminal.

FIGS. 11A and 11B are diagrams showing an example of data which are transmitted from the service terminal 60 to the relay terminal 40. As shown in FIG. 11A, the data to be transmitted here are such that a header is affixed to encrypted data. A TLV format should preferably be adopted for the header. FIG. 11B shows the contents of data which are contained in the header. A terminal middleware (MW) ID which specifies the relay terminal 40, and the storage instruction information 30 are contained in the header. Besides, a session ID, a data ID and an R/W ID may be contained in the header as shown in FIG. 11B.

The communication unit 50 of the relay terminal 40 receives the encrypted data transmitted from the service terminal 60 (S96). Besides, the relay terminal 40 transmits a response signal concerning the reception process of the encrypted data, to the service terminal 60 (S98), and the service terminal 60 receives the response signal, whereby the communications between the service terminal 60 and the relay terminal 40 are completed (S100). Owing to the operations thus far described, processing up to the transmission of the encrypted data and the transmission of the response made thereto as shown in FIG. 2 is completed (S26 and S28).

Subsequently, the relay terminal 40 writes the received encrypted data into the IC card 10 (S30).

Figure 12:
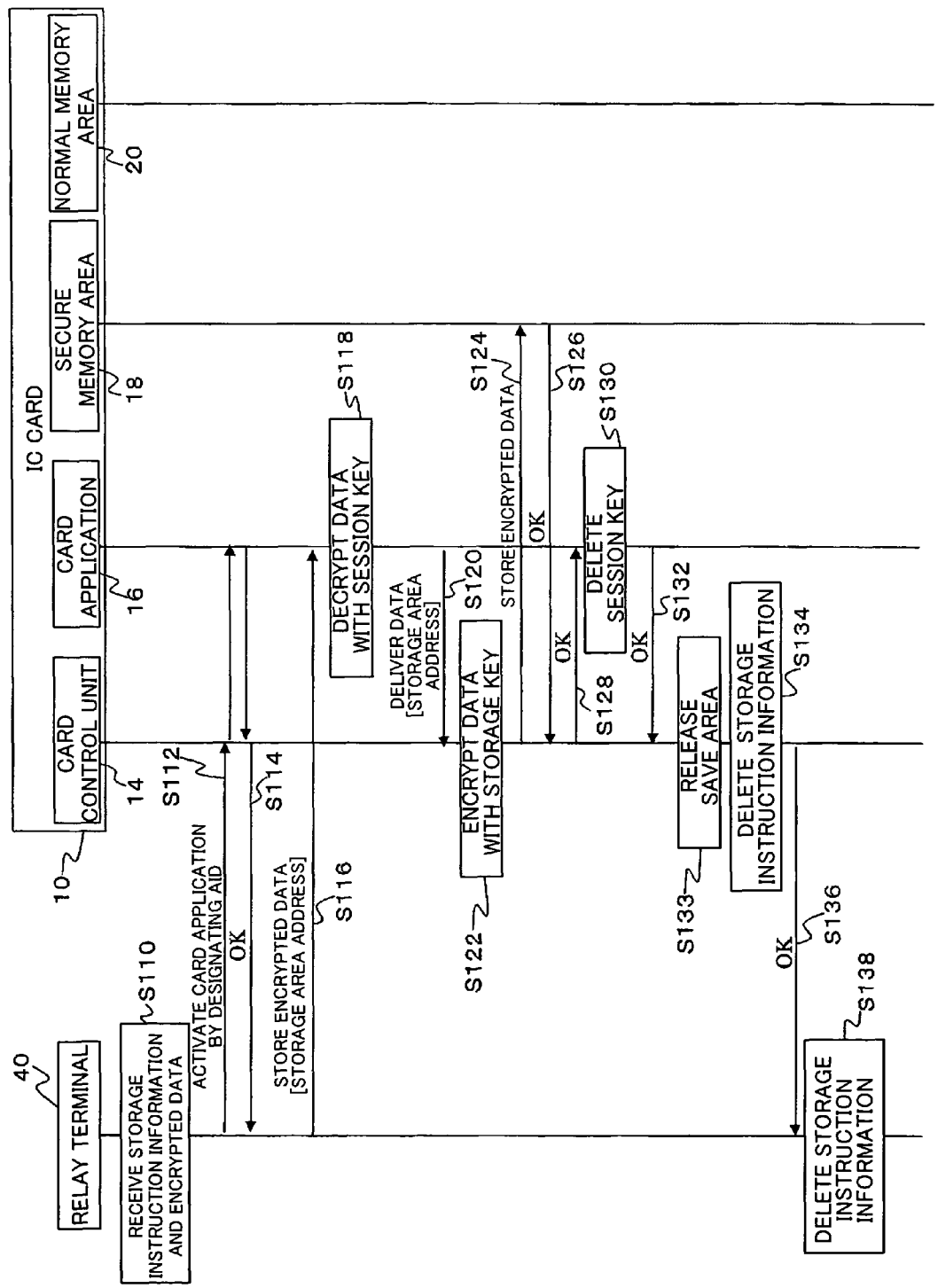
FIG. 12 is a diagram showing the operation of writing data into the IC card.
Figure 13:
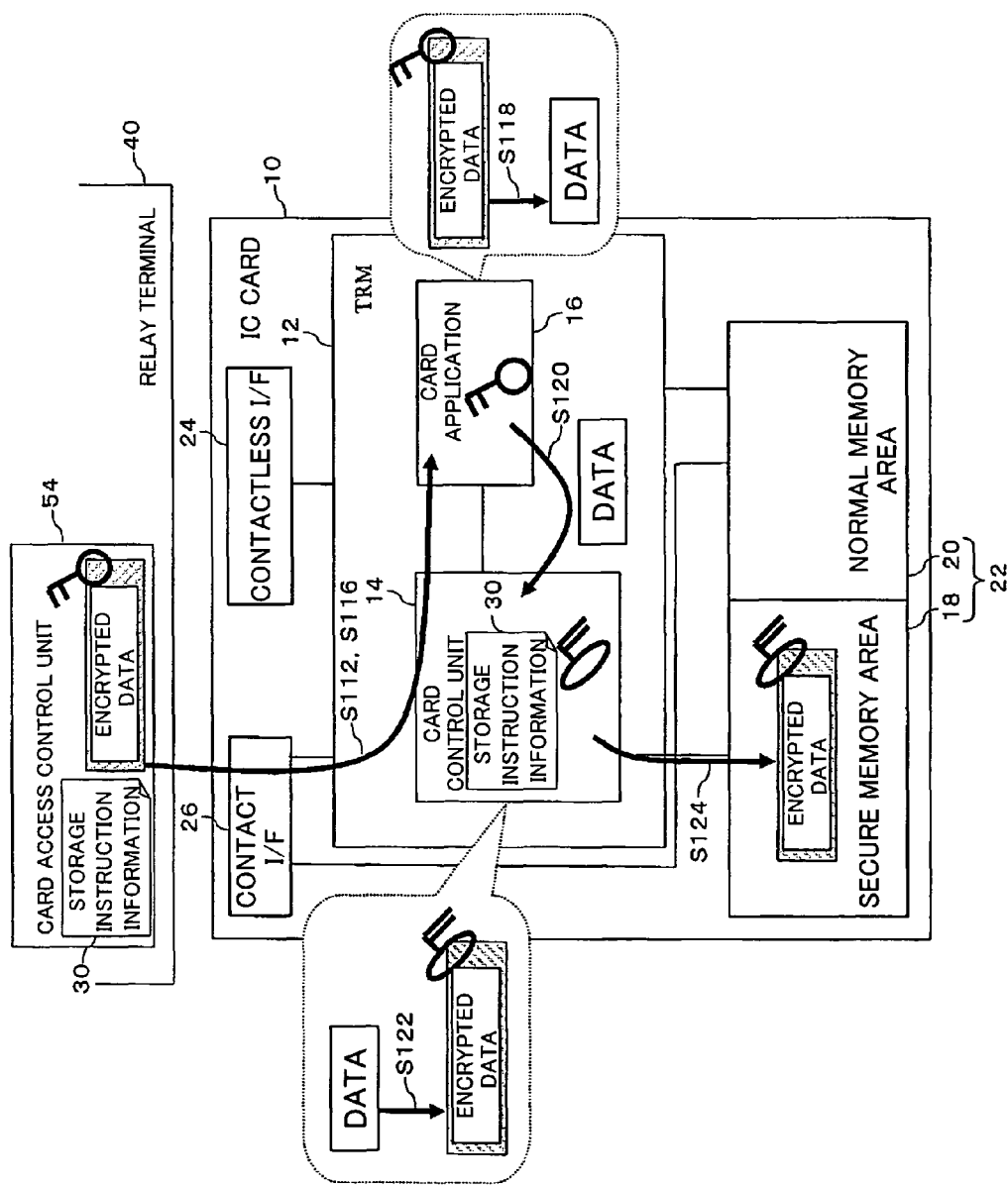
FIG. 13 is a diagram showing the flow of the data in the data write into the IC card.

FIG. 12 is a diagram showing the processes of the relay terminal 40 and the IC card 10 in detail, while FIG. 13 is a diagram showing the flow of data in the mode of writing the data into the IC card 10. As shown in FIG. 12, when the relay terminal 40 receives the storage instruction information 30 and the encrypted data transmitted from the service terminal 60 (S110), the relay terminal 40 instructs the IC card 10 to activate the card application 16, by designating an application ID (S112). Concretely, the card access control unit 54 of the relay terminal 40 transmits an IC access command for activating the card application 16. When the card control unit 14 of the IC card 10 receives the IC access command transmitted from the relay terminal 40, the IC card 10 activates the designated card application 16 and transmits the result of the process to the relay terminal 40 (S114).

Subsequently, the card access control unit 54 of the relay terminal 40 transmits the encrypted data to the IC card 10, and the relay terminal 40 gives the instruction of storing the encrypted data in the storage area address designated by the storage instruction information 30 (S116). The card application 16 of the IC card 10 decrypts the received encrypted data with the session key (S118), and delivers decrypted data to the card control unit 14 (S120). The card control unit 14 encrypts the decrypted data with a storage key (S122), and stores encrypted data in the secure memory area 18 (S124). When the card control unit 14 receives an OK notification indicating the result of the correct storage of the encrypted data (S126), it notifies the result of the storage process to the card application 16 (S128). When the card application 16 receives the notification of OK indicating the result of the correct storage of the data, it deletes the session key (S130) and transmits the result to the card control unit 14 (S132). When the card control unit 14 receives the notification of OK from the card application 16, it releases a save area memory having been reserved as a temporary save area in the case of an error (S133). Besides, the card control unit 14 deletes the storage instruction information 30 (S134) and transmits the result of the storage process of the data to the relay terminal 40 (S136). When the relay terminal 40 receives the notification of OK indicating the result of the correct storage of the data, the relay terminal 40 deletes the storage instruction information 30 (S138). Incidentally, the processing sequence of the deletion process of the session key (S128-S132) and the release process of the save area memory (S133) is not restricted to the above, but it may be reversed. In a case where the temporary save area in the case of the error is not reserved and where the data are temporarily retained in an empty area, the step S133 may be omitted. Thus far, there has been described the operation in which the IC card 10 is not in the busy state and writes the data normally.

Next, there will be described an operation in the case where the TRM 12 of the IC card 10 is in a busy state in the mode of writing data into the secure memory area 18. The operation will be outlined. In the case where the TRM 12 is busy, the relay terminal 40 saves encrypted data in the normal memory area 20 temporarily, and the relay terminal 40 reads out the storage instruction information 30 from the IC card 10 at an appropriate timing so as to move the data from the normal memory area 20 to the secure memory area 18 on the basis of the storage instruction information 30. The busy state of the IC card 10 may be detected by an error notification in the case of access to this IC card 10, or it may be judged by the card access control unit 54 of the relay terminal 40.

Figure 14:
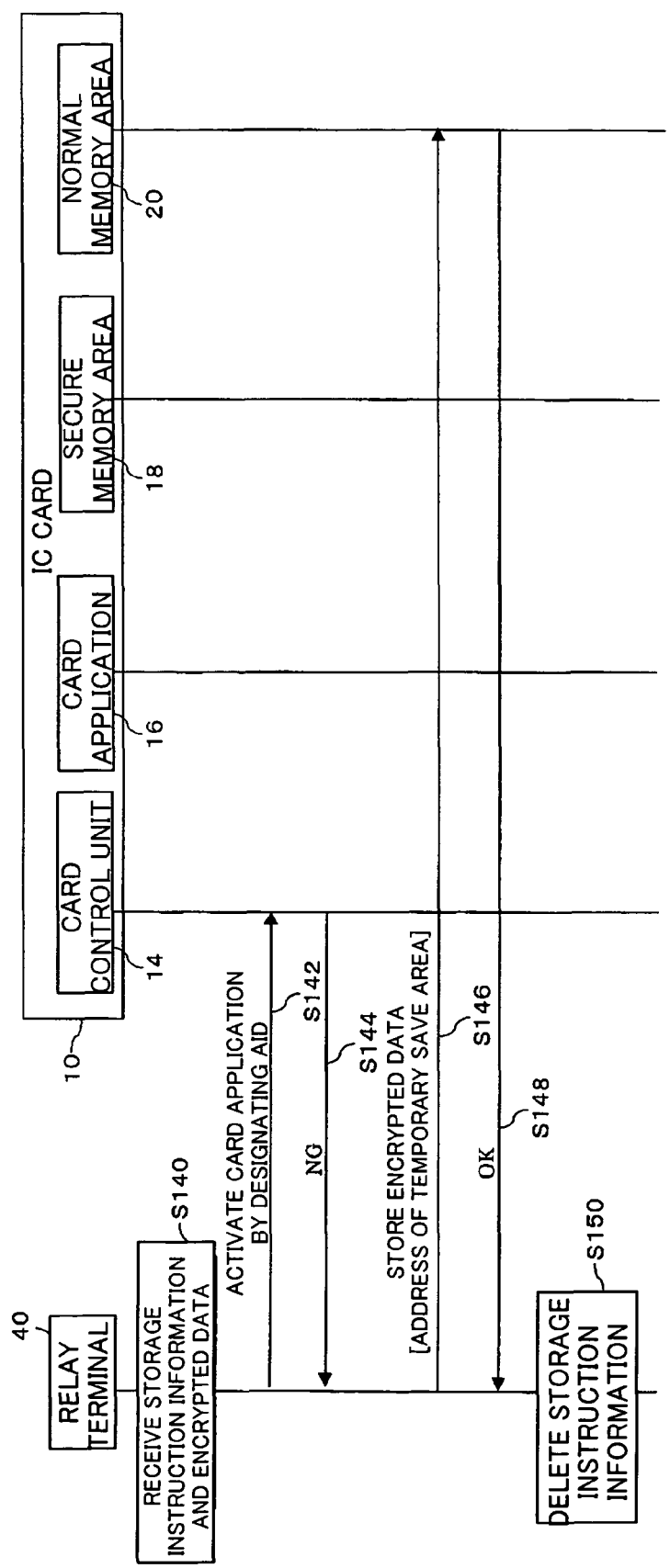
FIG. 14 is a diagram showing the operation of writing data in a case where the IC card is busy.
Figure 15:
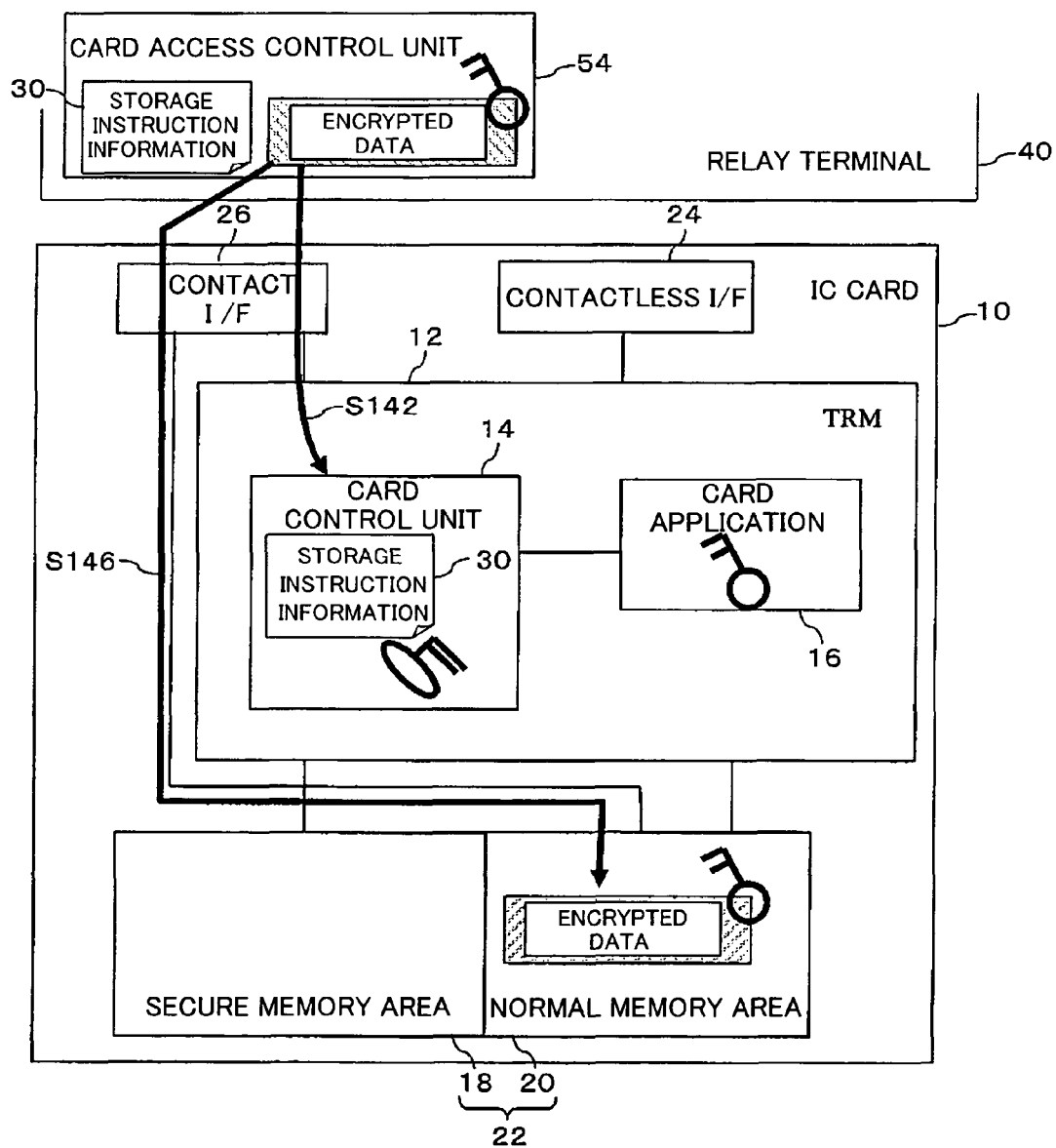
FIG. 15 is a diagram showing the flow of the data in the data write in the case where the IC card is busy.

FIG. 14 is a diagram showing the processes of the relay terminal 40 and the IC card 10, while FIG. 15 is a diagram showing the flow of data in the case where the IC card 10 is in the busy state in the mode of writing the data into the secure memory. As shown in FIG. 14, when the relay terminal 40 receives the storage instruction information 30 and encrypted data from the service terminal 60 (S140), the relay terminal 40 instructs the IC card 10 to activate the card application 16, by designating an application ID (S142). Concretely, the card access control unit 54 of the relay terminal 40 transmits an IC access command for activating the card application 16. Since the IC card 10 is in the busy state, the IC card 10 transmits the processed result of NG indicating the activation failure of the application, to the relay terminal 40 (S144).

When the relay terminal 40 receives the processed result of NG from the IC card 10, the relay terminal 40 stores the encrypted data in the normal memory area 20 of the IC card 10 (S146). Concretely, the card access control unit 54 of the relay terminal 40 transmits a memory access command by designating the address of a temporary save area designated by the storage instruction information 30. The memory access command is always accepted by the IC card 10, and an area for saving data is reserved in the normal memory area 20, so that the encrypted data can be reliably stored in the normal memory area 20. Here, as shown in FIG. 15, the encrypted data received by the relay terminal 40 are saved in the normal memory area 20 as they are. In a case where only the normal memory is designated as a save area in the case of an error, in the storage instruction information 30, the address of the save area is dynamically determined by the card control unit. Besides, the card control unit adds the address in which the data have been saved, to the save area in the case of the error, in the storage instruction information 30 held in this card control unit. In case of the relay terminal 40 in which the busy state of the card can be judged by the card access control unit 54, the encrypted data are stored in the normal memory 20 of the IC card 10 (S146) directly without performing the activation instruction of the card application 16 (S142) and the reception of the processed result of NG (S144).

When the relay terminal 40 receives the processed result of OK indicating the success of the encrypted data storage into the normal memory area 20, from the IC card 10 (S148), the relay terminal 40 deletes the storage instruction information 30 (S150). Owing to the above operations, in the case where the IC card 10 is in the busy state, the data can be temporarily saved in the normal memory area 20.

Next, there will be described the operation of moving the data saved in the normal memory area 20, to the secure memory area 18 at a suitable timing.

Figure 16:
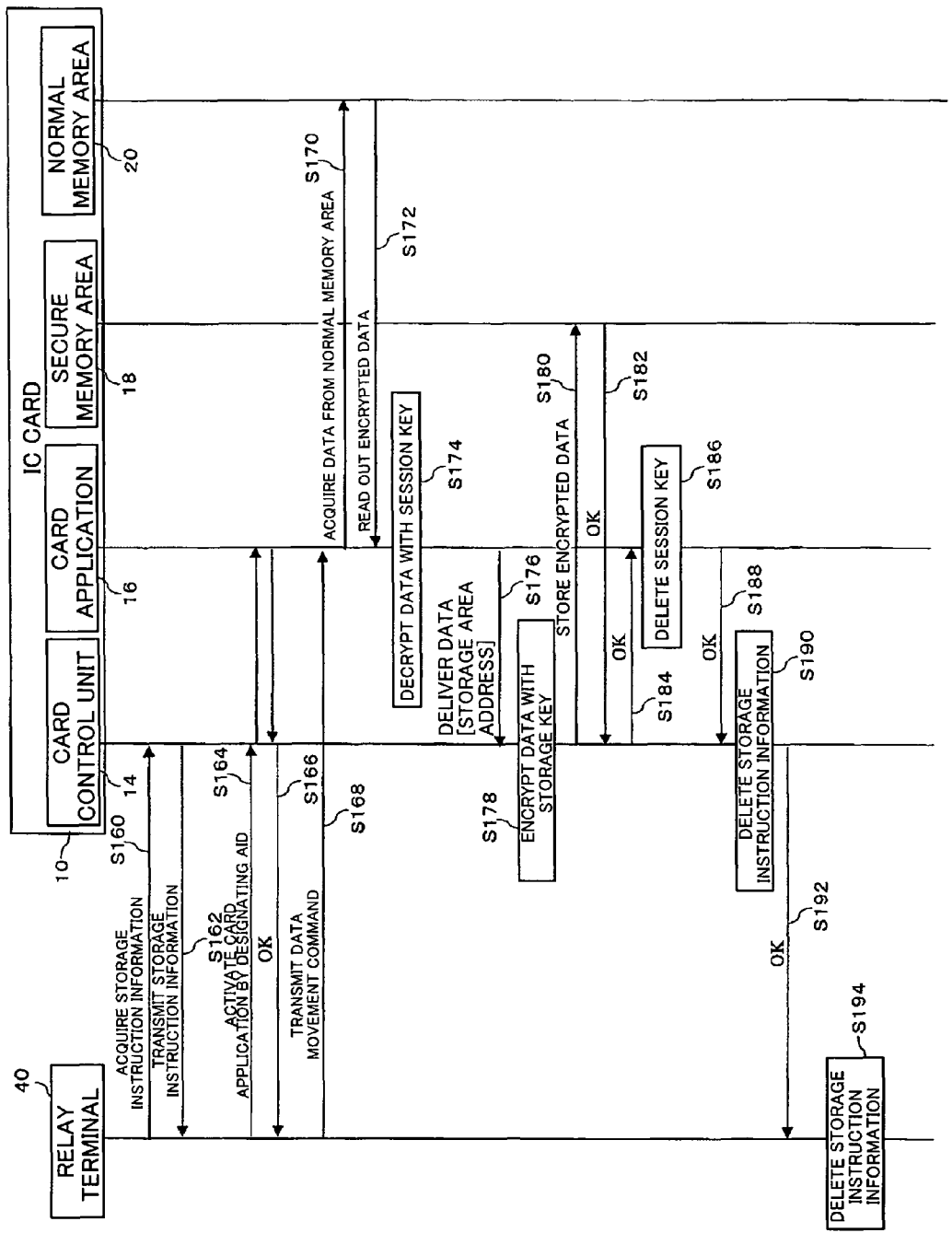
FIG. 16 is a diagram showing the operation of moving data from a normal memory area to a secure memory area.
Figure 17:
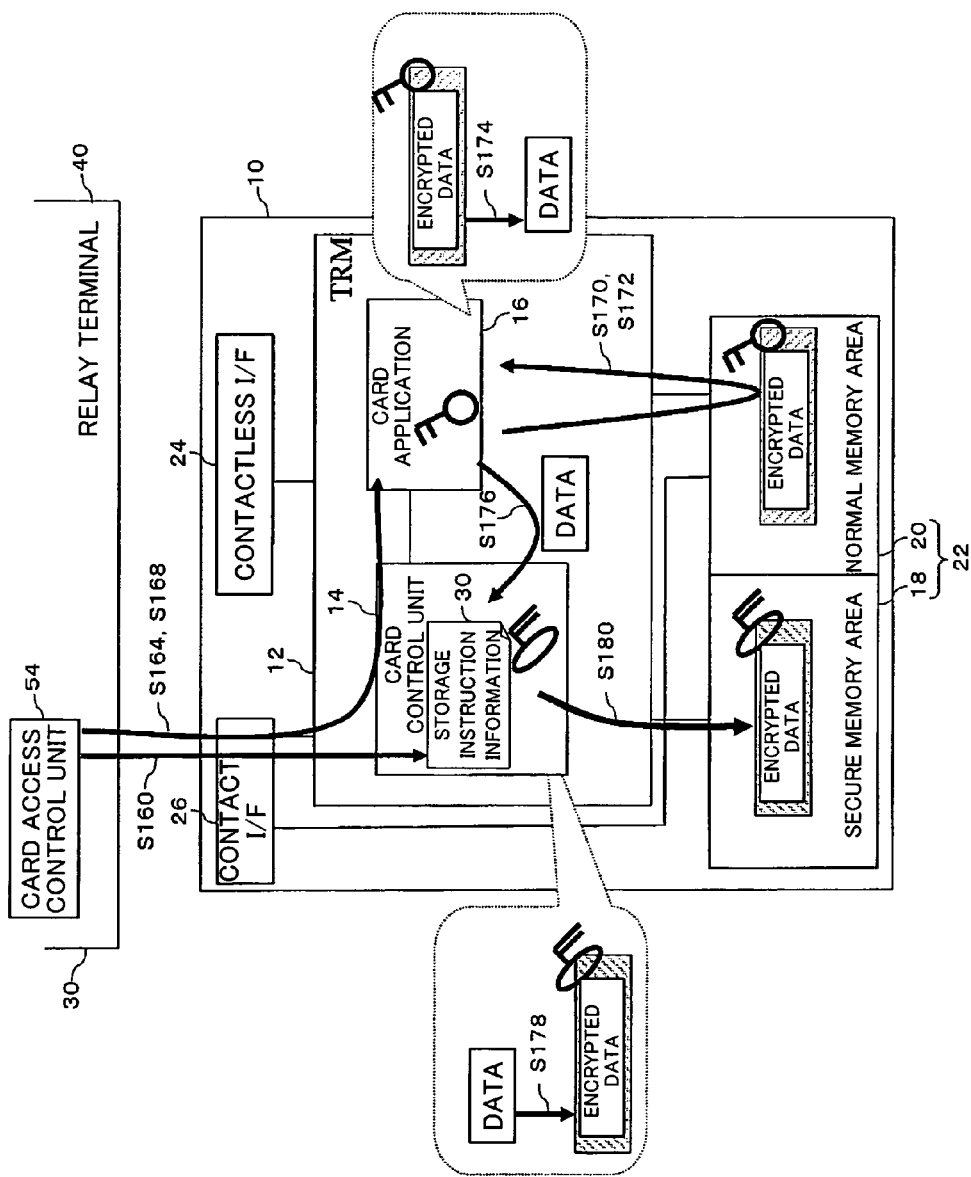
FIG. 17 is a diagram showing the flow of the data in the case of moving the data from the normal memory area to the secure memory area.

FIG. 16 is a diagram showing the processes of the relay terminal 40 and the IC card 10, while FIG. 17 is a diagram showing the flow of data in the case where the data saved in the normal memory area 20 are moved to the secure memory area 18. As shown in FIG. 16, the relay terminal 40 transmits a request for acquiring the storage instruction information 30, to the IC card 10 (S160). A timing at which the request for acquiring the storage instruction information 30 is transmitted may be a time at which a predetermined time period has lapsed since the detection of the busy state of the IC card 10, or it may be a time at which an OK response has been received after transmitting an IC card access command for monitoring the state of the IC card 10, to this IC card 10.

When the card control unit 14 of the IC card 10 receives the request for the acquisition of the storage instruction information 30 from the relay terminal 40, the IC card 10 transmits the storage instruction information 30 to the relay terminal 40 (S162). Subsequently, the relay terminal 40 designates an application ID designated by the acquired storage instruction information 30, and the relay terminal 40 transmits an IC access command for activating the card application 16, to the IC card 10 (S164). When the card control unit 14 of the IC card 10 receives the IC access command, the IC card 10 executes a process for activating the designated card application 16 and transmits the result of the process to the relay terminal 40 (S166). In the example shown in FIG. 16, the card application 16 is normally activated, and OK is transmitted to the relay terminal 40 as the processed result.

After activating the card application 16, the relay terminal 40 transmits a command for moving data from the normal memory area 20 to the secure memory area 18, to the IC card 10 (S168). Concretely, an address in which encrypted data are temporarily saved, and the address of the secure memory 18 for the storage area of the encrypted data, are extracted from the storage instruction information 30, and an IC access command containing the extracted address information items is transmitted to the IC card 10. When the card application 16 of the IC card 10 receives the data movement command from the relay terminal 40, the IC card 10 moves the data on the basis of the received data movement command. More specifically, the card application 16 accesses the normal memory area 20 on the basis of the designated save area address, and the card application 16 reads out the encrypted data stored in the normal memory area 20 (S170 and S172). Subsequently, the card application 16 decrypts the read-out encrypted data with a session key (S174), and the card application 16 delivers decrypted data and the storage area address of the data to the card control unit 14 (S176).

The card control unit 14 encrypts the data delivered from the card application 16, with a storage key (S178), and the card control unit 14 stores encrypted data in the secure memory area 18 indicated by the designated storage area address (S180). When the card control unit 14 receives the response of OK indicating the success of the storage of the encrypted data (S182), the card control unit 14 transmits the response of OK to the card application 16 (S184). Upon receiving this response of OK, the card application 16 deletes the session key (S186), and the card application 16 transmits the response of OK to the card control unit 14 (S188). Upon receiving this response of OK, the card control unit 14 deletes the storage instruction information 30 (S190), and the card control unit 14 transmits the response of OK to the relay terminal 40 (S192). When the relay terminal 40 receives the notification of OK indicating the normal completion of the movement of the data, from the IC card 10, the relay terminal 40 deletes the storage instruction information 30 (S194). Owing to the movement of the data (S170 and S172), the memory area of the temporary save area of the data as has been reserved at the step 72 is released. In this manner, the data temporarily saved in the normal memory area 20 can be moved to the secure memory area 18 by the operations shown in FIGS. 16 and 17.

Next, there will be described a case where data saved in the normal memory area 20 could not be moved to the secure memory area 18 at a suitable timing, and where a "storage area reservation term" instructed in the storage instruction information 30 has expired.

Figure 27:
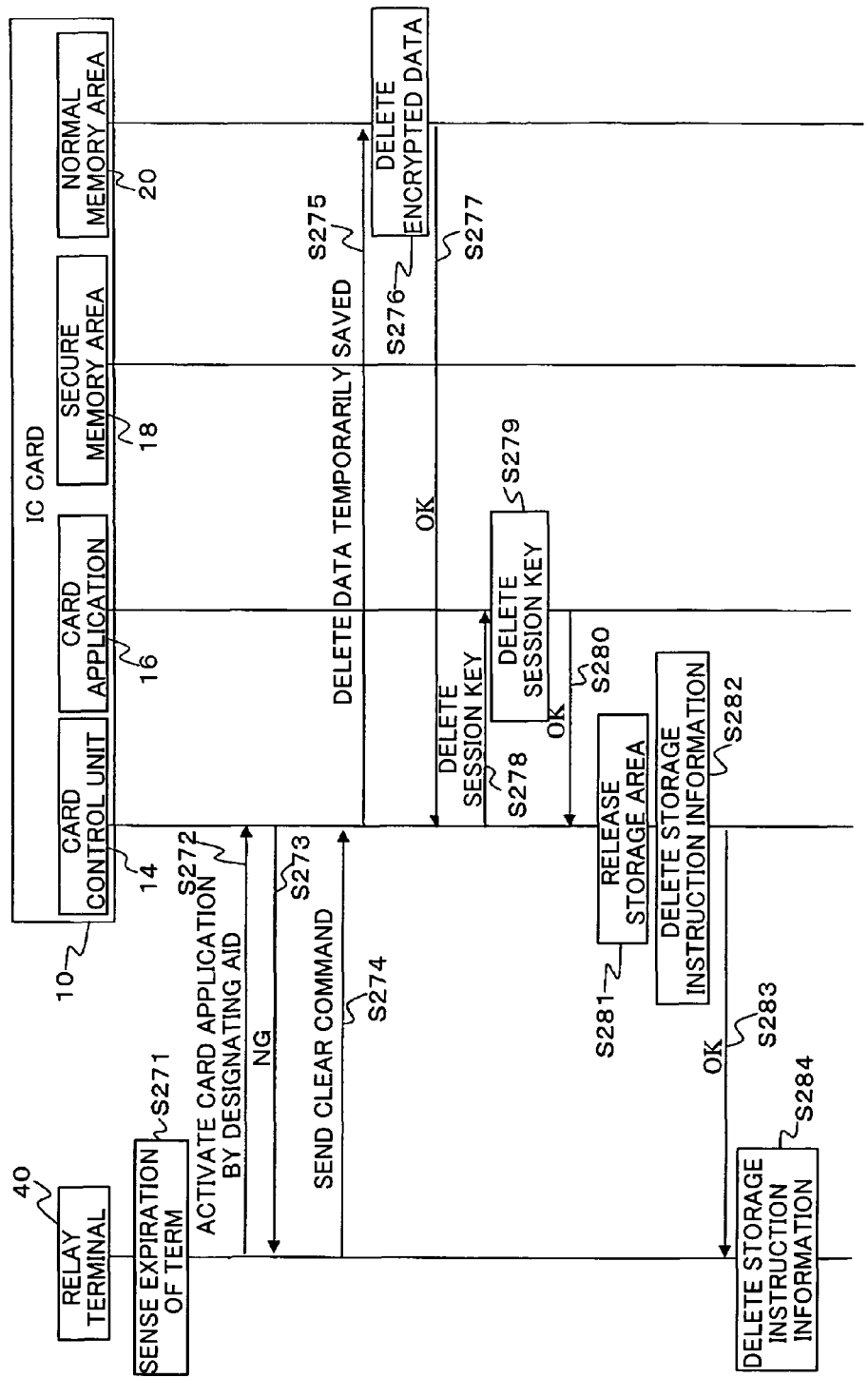
FIG. 27 is a diagram showing the operation of deleting data in a case where a storage area reservation term has expired.

FIG. 27 is a diagram showing the processes of the relay terminal 40 and the IC card 10 in the case where the storage area reservation term has expired. The card access control unit 54 of the relay terminal 40 senses arrival at the date and hour indicated in the "storage area reservation term" by a notification from the card control unit 14, or in such a way that the relay terminal 40 acquires the storage instruction information 30 held in the card control unit 14. In the case where the arrival is sensed by the notification from the card control unit 14, the relay terminal 40 acquires the storage instruction information 30 from the IC card 10 immediately after the sensing. Since the acquisition of the storage instruction information 30 is the same as in the procedure shown in FIG. 16, it shall be omitted from FIG. 27.

When the card access control unit 54 of the relay terminal 40 senses the arrival at the date and hour indicated in the "storage area reservation term" (S271), the relay terminal 40 executes a process for moving data saved in the normal memory area 20, to the secure memory area 18, again. Concretely, the card access control unit 54 transmits to the IC card 10, an IC access command which designates an application ID designated in the storage instruction information 30 and which activates the card application 16 (S272). In a case where the activation of the card application 16 failed (S273), or in a case where an error developed in the course of the data movement process as shown in FIG. 16, and where the data were not normally moved, the card access control unit 54 of the relay terminal 40 sends a clear command to the card control unit 14 (S274). Upon receiving the clear command, the card control unit 14 deletes the data temporarily saved in the normal memory (S275-S277), deletes a session key retained in the card application (S278-S280) and releases the secure memory area 18 reserved at the step S68 (S281). Besides, the card control unit 14 deletes the storage instruction information 30 (S282) and notifies the success of the clearing to the relay terminal 40 (S283). Upon receiving the notification, the relay terminal 40 deletes the storage instruction information 30 acquired beforehand (S284). The processing sequence of the deletion process of the data temporarily saved in the normal memory, the deletion process of the session key saved in the card application and the release process of the secure memory area 18 is not restricted to the above, but it may be changed.

In this manner, owing to the operations shown in FIG. 27, it is preventable that, although data are not stored, the secure memory area is kept reserved, so the remaining quantity of the memory becomes small.

Also in a case where the transmission of the encrypted data from the service terminal 60 to the relay terminal 40 (S26 in FIG. 2) failed and where the "storage area reservation term" instructed in the storage instruction information 30 has expired, the card access control unit 54 of the relay terminal 40 sends the clear command to the card control unit 14 as in FIG. 27 (S274). In this case, however, the deletion of the data temporarily saved in the normal memory (S275-S277) may be omitted.

In the embodiment of the invention, the card access control unit 54 of the relay terminal 40 checks whether or not the storage instruction information 30 is retained in the card control unit 14, infallibly in a case where the IC card 10 has been inserted into the relay terminal 40 and where the initialization process of this IC card is to be executed. In a case where the storage instruction information 30 is retained, the movement process of the retained data as stated above is performed. In a case where the storage area reservation term has expired, the clear process shown in FIG. 27 is performed.

Thus far, the IC card 10 and the relay terminal 40 in the first embodiment of the invention have been described.

The IC card 10 in the first embodiment stores the storage instruction information 30 designating the storage area and temporary save area of data, and retains the storage instruction information 30 in the card control unit 14. Besides, in a case where the TRM 12 of the IC card 10 is busy in writing the data of the secure memory area 18 of the IC card 10 from the relay terminal 40, the data are temporarily saved in the normal memory area 20 for the temporary save area, and the data are moved later from the temporary save area to the secure memory area 18 being the final storage area. Thus, even when the TRM 12 is in the busy state, the data can be reliably stored in the secure memory area 18 of the IC card 10.

After having temporarily saved data in the normal memory area 20, the relay terminal 40 deletes the storage instruction information 30, and the relay terminal 40 reads out the storage instruction information 30 from the IC card 10 in moving the data later. Therefore, a risk at which the storage instruction information 30 containing the address of the temporary save area of the data is read out from the relay terminal 40 can be reduced, and a security can be enhanced.

The relay terminal 40 as a data transmission destination is determined in accordance with the attribute information of data, and the storage instruction information 30 which contains transmission destination information specifying the particular relay terminal 40 is transmitted to the service terminal 60. Therefore, the service terminal 60 can transmit the data to the appropriate relay terminal 40.

Since the card control unit 14 reserves a storage area in the secure memory area 18, data can be stored in the secure memory area 18 without incurring a memory insufficiency. Also, the relay terminal 40 causes the card control unit 14 to execute a clear process in accordance with a storage area reservation term to prevent the utilizable area of the secure memory area from decreasing because the memory is kept reserved.

The relay terminal 40 checks the existence or nonexistence of the storage instruction information 30 infallibly when the IC card 10 has been inserted anew to prevent data desired to be retained in the secure memory area from being kept saved in the normal memory area 20, and a security can be enhanced.

Next, a modified embodiment of the IC card system of the first embodiment will be described. Although the basic configuration of an IC card system according to the modified embodiment is the same as in the IC card system of the first embodiment, the operation thereof in the case of moving data from a normal memory area 20 to a secure memory area 18 is different.

Figure 18:
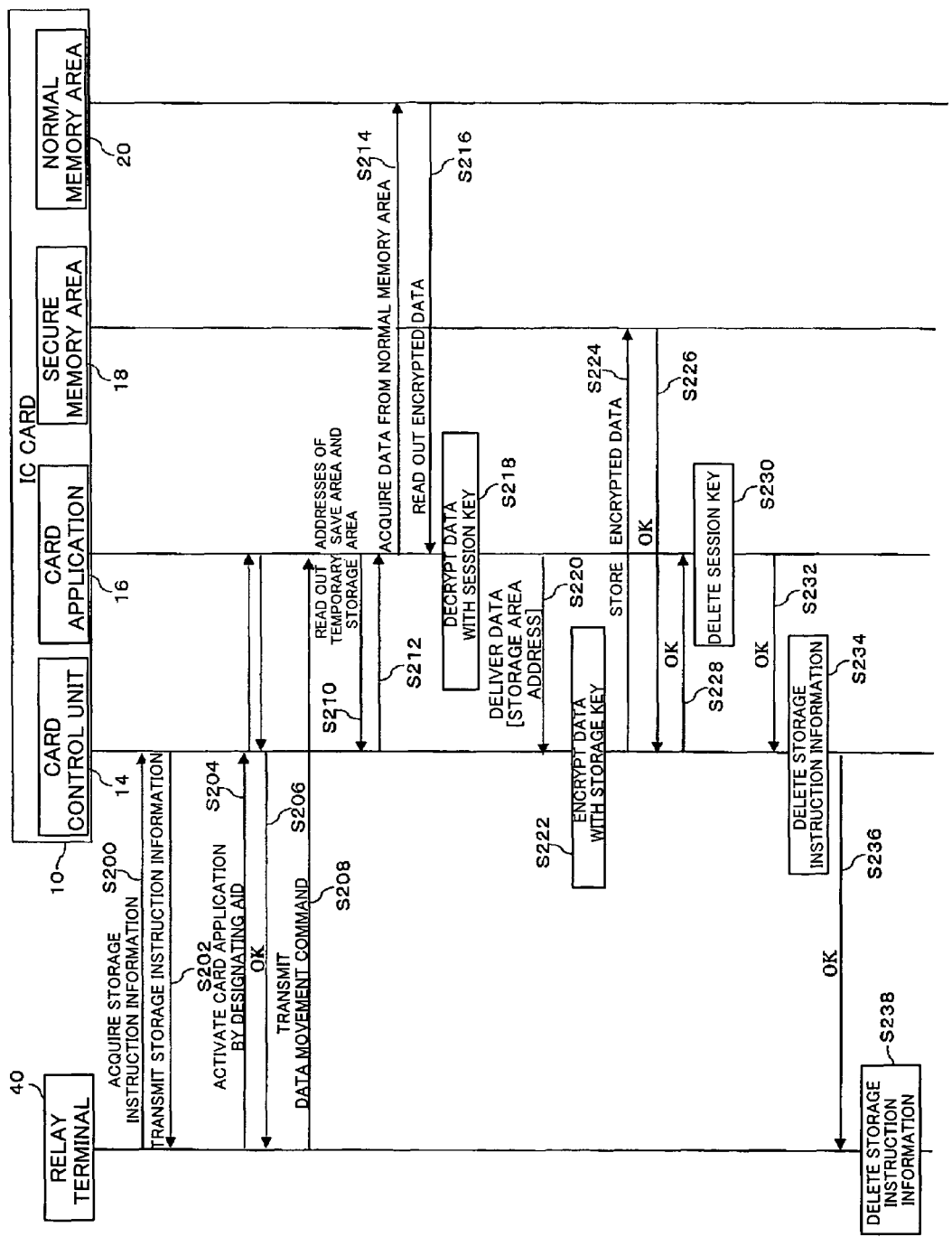
FIG. 18 is a diagram showing the operation of moving data from the normal memory area to the secure memory area.
Figure 19:
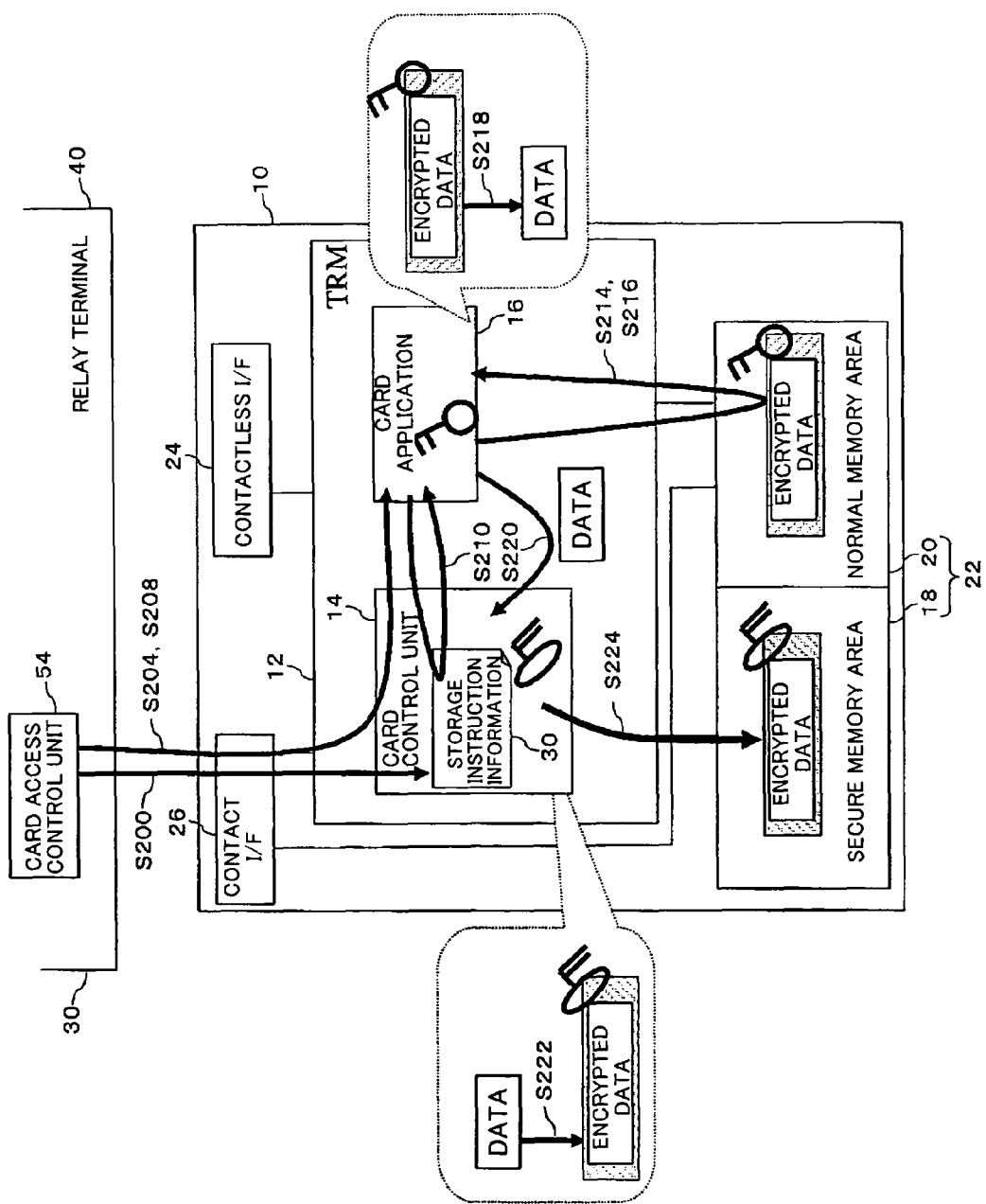
FIG. 19 is a diagram showing the flow of the data in the case of moving the data from the normal memory area to the secure memory area.

FIG. 18 is a diagram showing the processes of a relay terminal 40 and an IC card 10, while FIG. 19 is a diagram showing the flow of data in the case where the data saved in the normal memory area 20 are moved to the secure memory area 18. In the IC card system according to the modified embodiment, the operation of moving the data from the normal memory area 20 to the secure memory area 18 is basically the same as in the first embodiment, but it differs in the point that a temporary save area address and a storage area address are not contained in a data movement command which the IC card 10 transmits. When the card application 16 of the IC card 10 receives the data movement command from the relay terminal 40 (S208), the IC card 10 reads out storage instruction information 30 stored in the card control unit 14 of the IC card 10 (S210 and S212), and the card control unit 14 acquires the temporary save area address and the storage area address. The operation of the IC card system of the modified embodiment after having acquired the temporary save area address and the storage area address is the same as in the IC card system of the first embodiment.

Next, an IC card system in the second embodiment of the invention will be described. Although the basic configuration of the IC card system of the second embodiment is the same as in the IC card system of the first embodiment, the configuration of an IC card 10 in the second embodiment differs from that of the IC card in the first embodiment. In consequence, a procedure for moving data temporarily saved in a normal memory area 20, to a secure area differs from that of the first embodiment.

Figure 20:
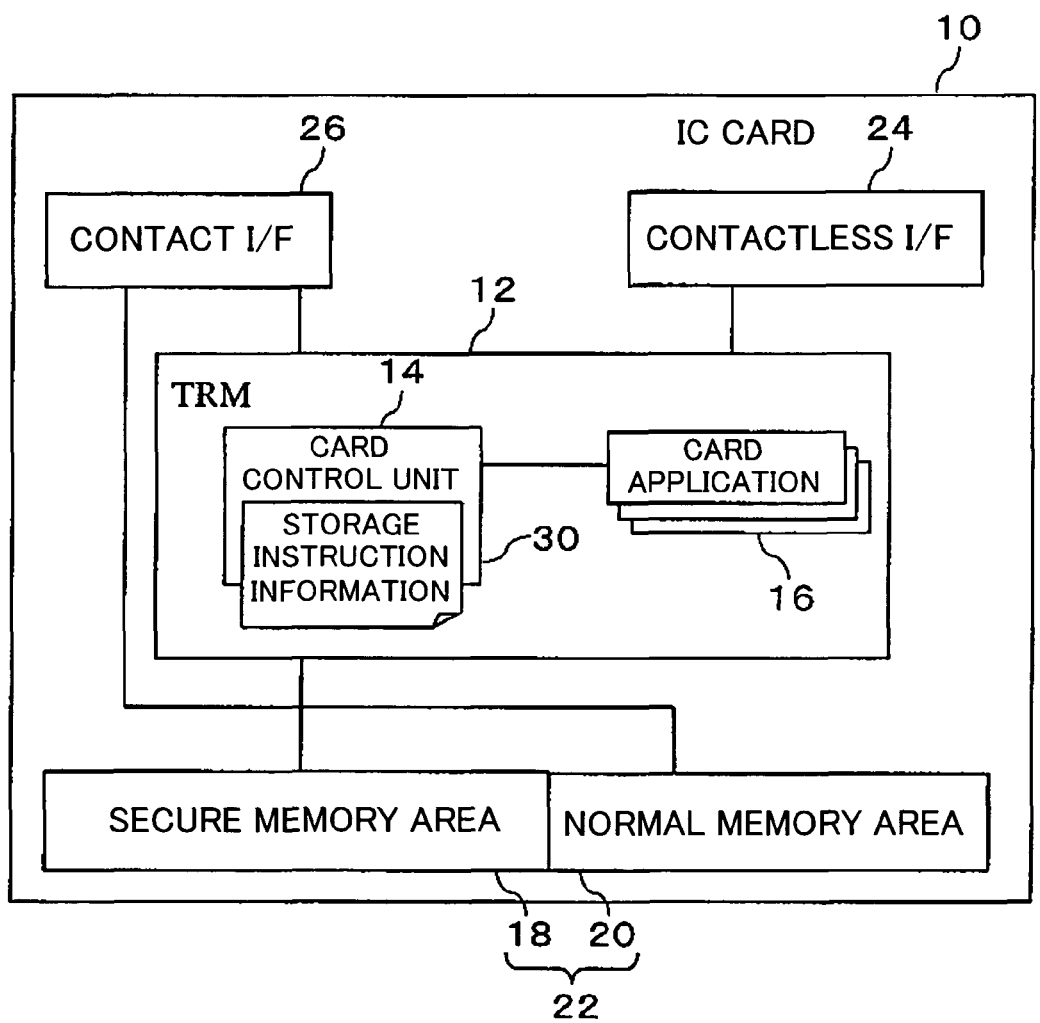
FIG. 20 is a diagram showing the configuration of an IC card for use in a second embodiment.

FIG. 20 is a diagram showing the configuration of the IC card 10 for use in the second embodiment. Unlike in the first embodiment, the IC card 10 in the second embodiment is such that the TRM 12 thereof cannot access the normal memory area 20. Owing to this configuration, the TRM 12 and the secure memory area 18 are isolated from the normal memory area 20, whereby a security can be further enhanced.

Figure 21:
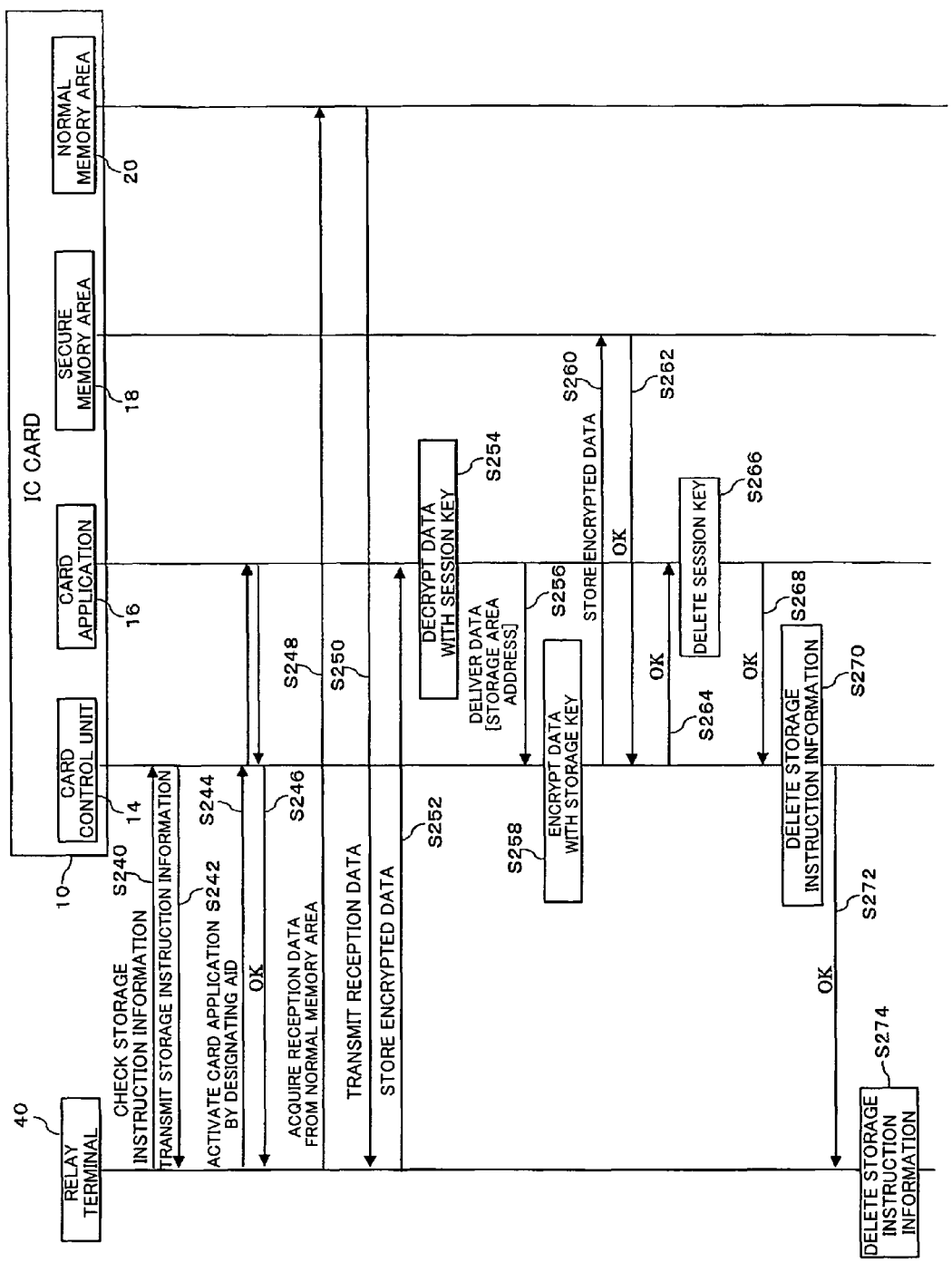
FIG. 21 is a diagram showing the operation of a data movement in the second embodiment.
Figure 22:
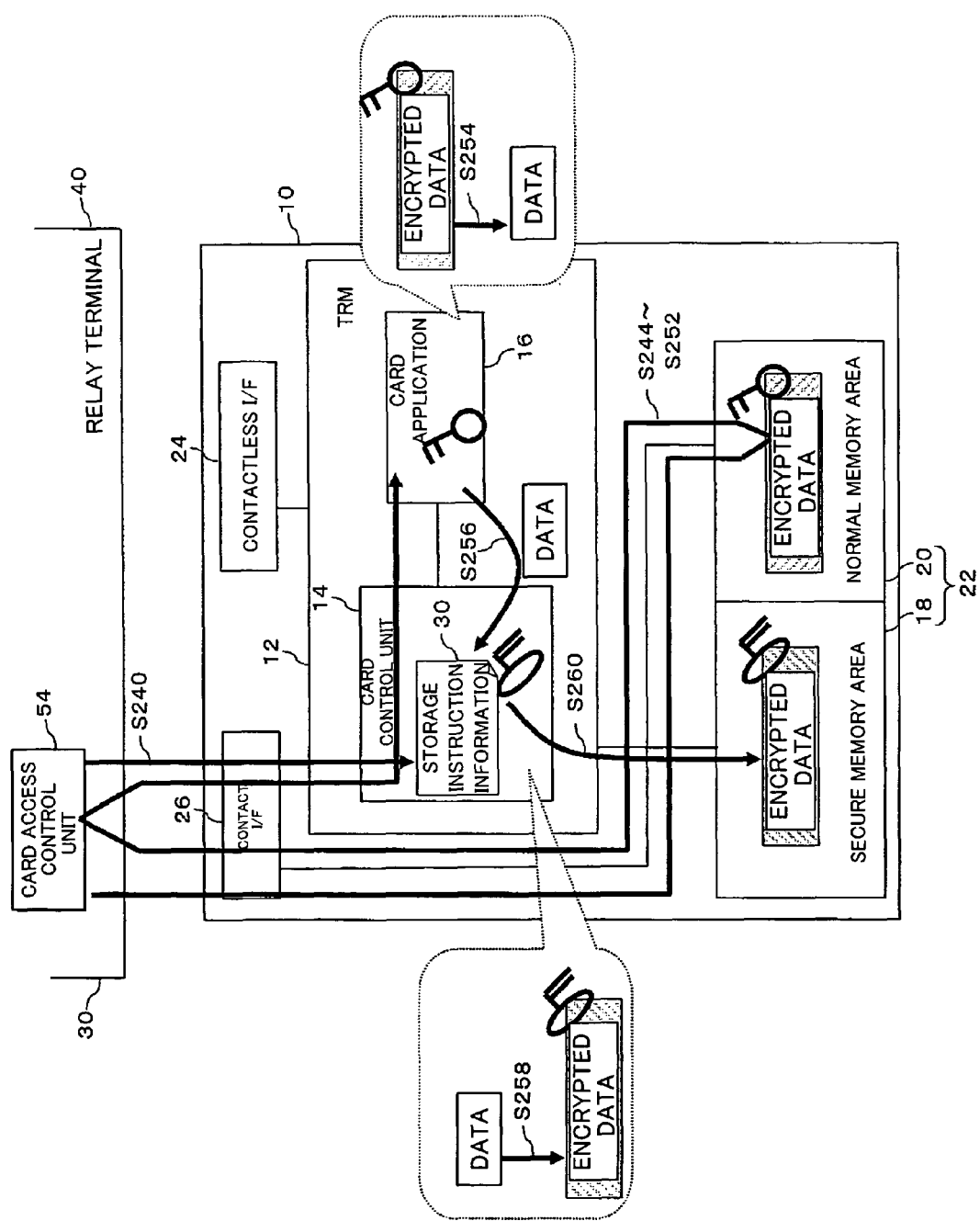
FIG. 22 is a diagram showing the flow of data in the data movement in the second embodiment.

FIG. 21 is a diagram showing the processes of a relay terminal 40 and the IC card 10, while FIG. 22 is a diagram showing the flow of data in the case where the data saved in the normal memory area 20 are moved to the secure memory area 18.

As shown in FIG. 21, operations in which the relay terminal 40 acquires storage instruction information 30 from the IC card 10 at a suitable timing until a card application 16 is activated (S240-S246) are the same as in the first embodiment. In the second embodiment, after the activation of the card application 16, the relay terminal 40 accesses the normal memory area 20 of the IC card 10 and reads out the data temporarily saved. Concretely, the relay terminal 40 transmits a memory access command for reading out the encrypted data from a save area address designated in the storage instruction information 30 (S248), and the relay terminal 40 receives the data from the IC card 10 (S250).

Subsequently, the relay terminal 40 transmits the encrypted data read out of the normal memory area 20, to the IC card 10, and the relay terminal 40 also transmits an IC access command for storing the encrypted data (S252). The card application 16 of the IC card 10 decrypts the received encrypted data with a session key (S254), and the card application 16 delivers decrypted data to the card control unit 14 of the IC card 10 (S256). The card control unit 14 encrypts the data delivered from the card application 16, with a storage key (S258), and the card control unit 14 stores encrypted data in the secure memory area 18 (S260). Operations after the card control unit 14 has stored the data in the secure memory area 18 (S262-S274) are the same as in the first embodiment.

Thus far, the IC card 10 and the relay terminal 40 in the second embodiment of the invention have been described.

The relay terminal 40 in the second embodiment reads out data temporarily saved in the normal memory area 20 of the IC card 10, and writes the read-out data into the secure memory area 18. This configuration brings forth the advantage that, even in the IC card 10 of the type in which the TRM 12 cannot access the normal memory area 20, the data can be reliably received in the same manner as in the first embodiment.

Next, a modified embodiment of the IC card system of the second embodiment will be described. An IC card system according to the modified embodiment differs from the second embodiment in the point that data received by a relay terminal 40 are temporarily saved by a terminal memory area (RAM) 44.

Figure 23:
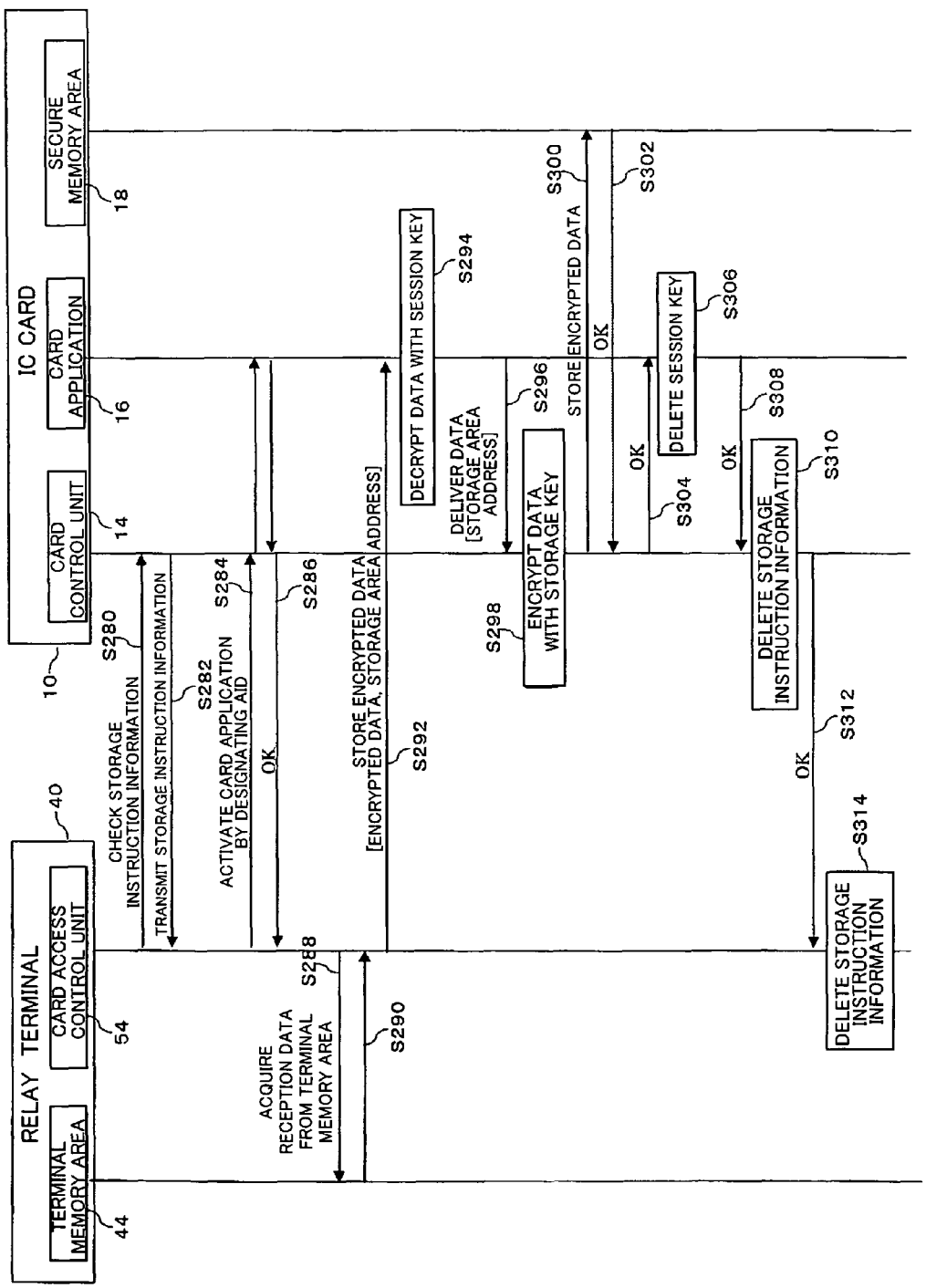
FIG. 23 is a diagram showing the operation of a data movement in the second embodiment.
Figure 24:
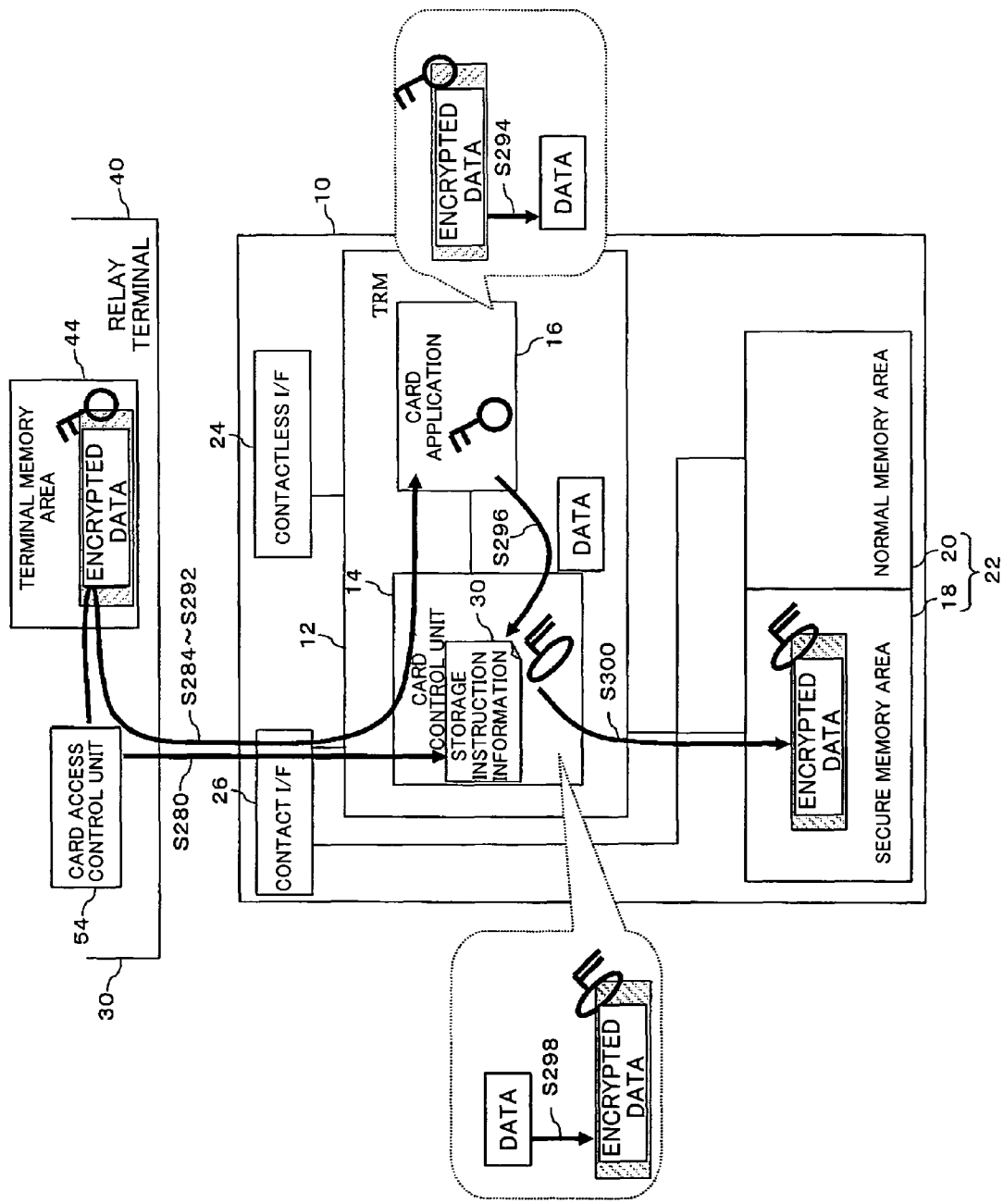
FIG. 24 is a diagram showing the flow of data in the data movement in the second embodiment.

FIG. 23 is a diagram showing the processes of the relay terminal 40 and an IC card 10, while FIG. 24 is a diagram showing the flow of data in the case where the data saved in the terminal memory area 44 are moved to a secure memory area 18.

As shown in FIG. 23, operations in which the relay terminal 40 acquires storage instruction information 30 from the IC card 10 at a suitable timing until a card application 16 is activated (S280-S286) are the same as in the second embodiment. In the modified embodiment, after the activation of the card application 16, the card access control unit 54 of the relay terminal 40 accesses the terminal memory area 44 (S288) and reads out the data temporarily saved (S290). Operations after the temporarily saved data have been read out (S292-S314) are the same as in the second embodiment.

Owing to the configuration in which, in this manner, the received data are temporarily saved in the terminal memory area 44 so as to move the data of the secure memory area 18 from the terminal memory area 44, the data movement is not limited by the remaining capacity of the normal memory area 20 of the IC card 10. That is, even in a case where the remaining capacity of the normal memory area 20 is small, the IC card 10 can be caused to reliably receive data.

While the secure device and relay terminal of the invention have been described above in detail by mentioning the embodiments, they are not restricted to the foregoing embodiments.

In each of the foregoing embodiments, a signature verification may be made with the session key in writing the data from the relay terminal 40 into the IC card 10.

Figure 25:
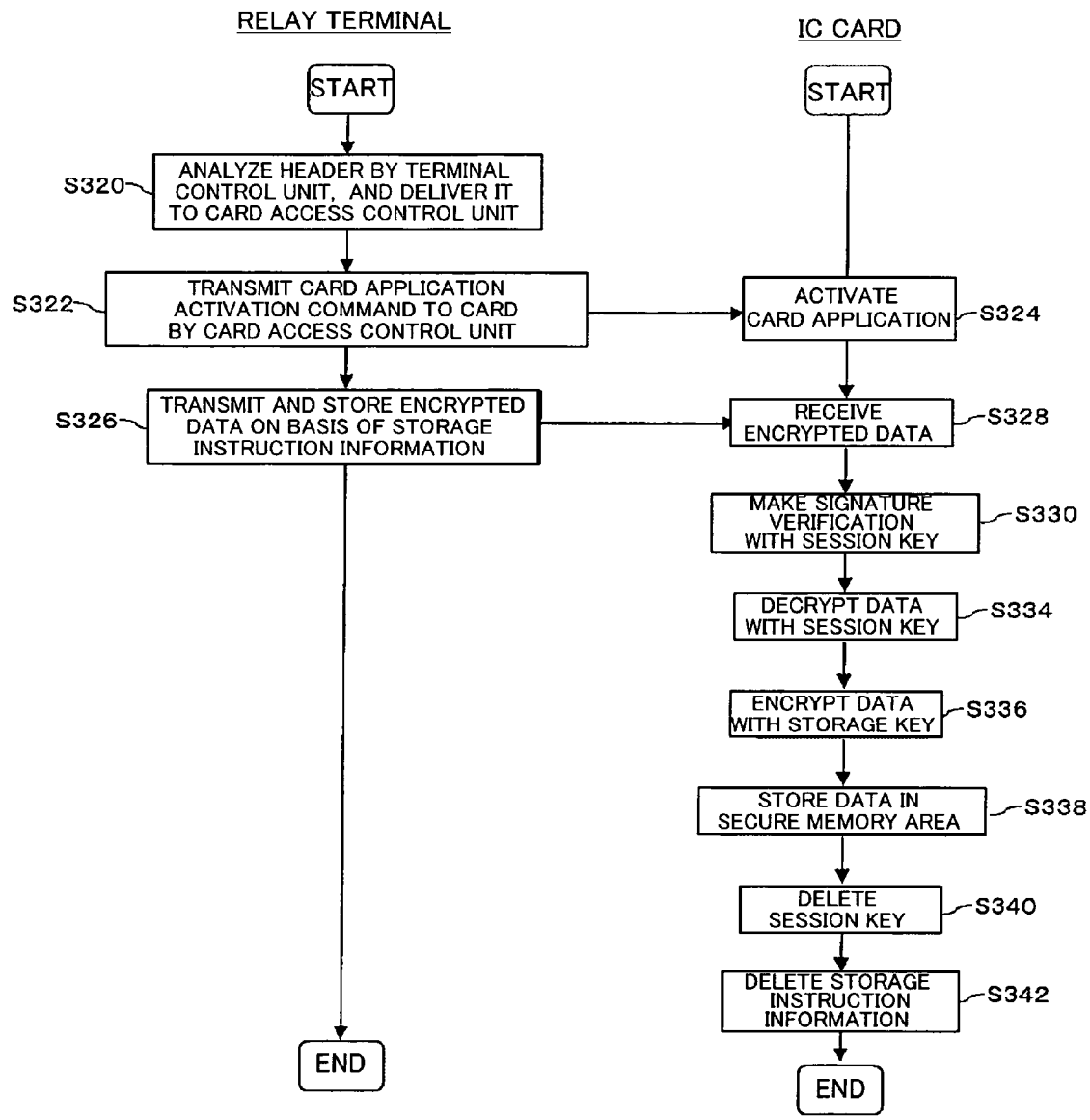
FIG. 25 is a diagram showing the operation of writing data into an IC card in a modified embodiment.

FIG. 25 is a diagram showing a data write process which includes the step S330 of a signature verification based on a session key. As shown in FIG. 25, after an IC card 10 has received encrypted data, the signature verification based on the session key is made, whereby a security can be further enhanced.

In each of the foregoing embodiments, it is also allowed to adopt a configuration in which the session key is managed every session ID.

Figure 26:
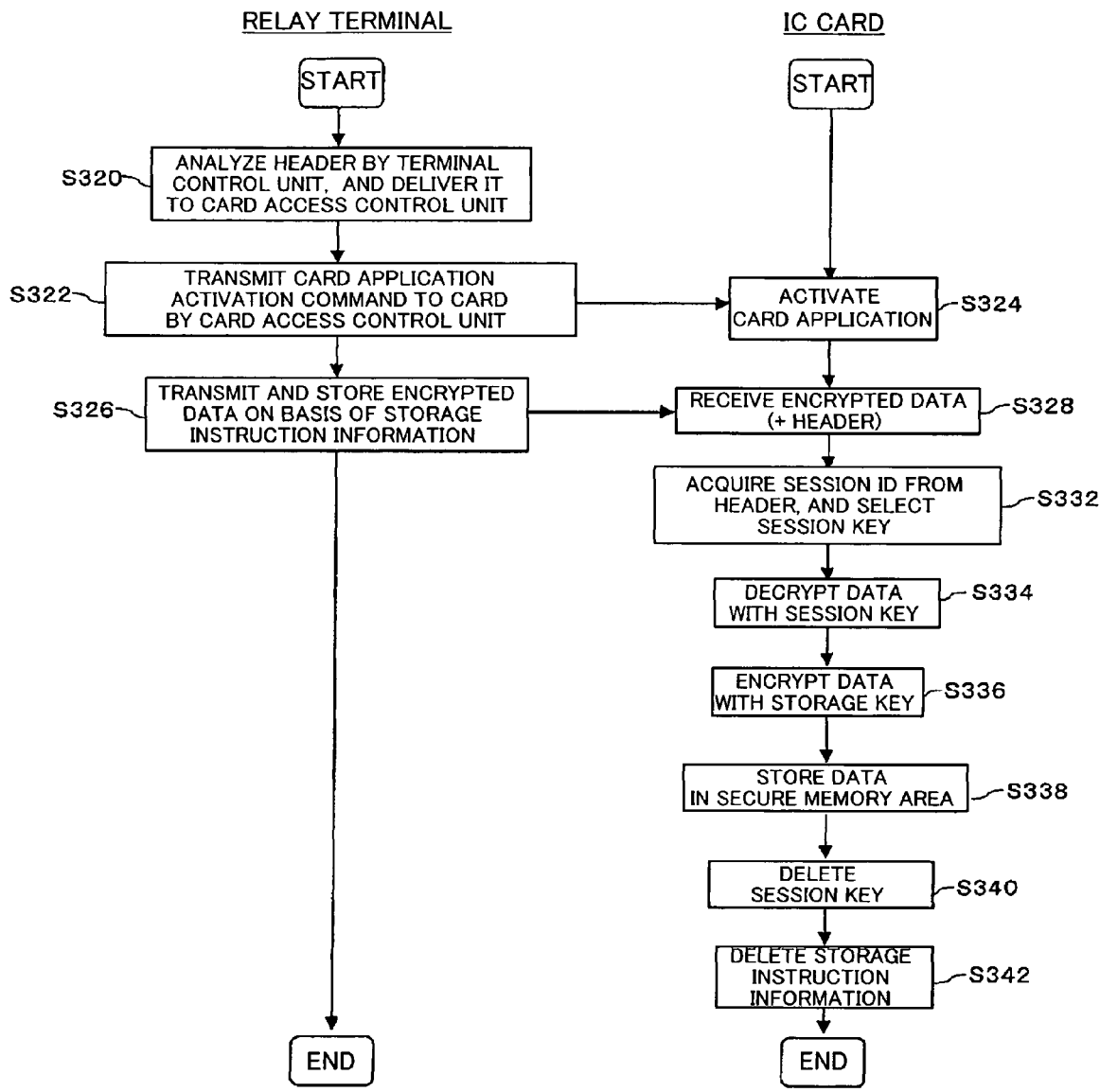
FIG. 26 is a diagram showing the operation of writing data into an IC card in a modified embodiment.

FIG. 26 is a diagram showing a data write process which includes the step S332 of selecting a session key in accordance with a session ID. As shown in FIG. 26, after an IC card 10 has received encrypted data, the session ID is read out from a header, and the session key corresponding to the session ID is selected. Besides, the IC card 10 decrypts the data by employing the selected session key. Owing to this configuration, the appropriate session key can be selected in accordance with the session ID, and hence, the data can be appropriately processed even in the existence of a plurality of sessions which transmit data from a service terminal 60 to the IC card 10.

In the foregoing embodiments, the IC card 10 has been described as the example of the secure device, but the invention is also applicable to any secure device other than the IC card.

As described above, according to the invention, the address of a normal memory for temporarily saving data is contained in storage instruction information, whereby when the data cannot be written into a secure memory area, they are once written into the normal memory, and after the secure memory area has been permitted to write the data thereinto, the write becomes executable, so that even in a state where the data cannot be written into the secure memory area temporarily, they can be reliably written into the secure memory area.

While the preferred embodiments of the invention thought out at the current point of time have been described above, it is to be understood that multifarious modifications can be made to the embodiments. The appended claims shall cover all modifications which fall within the true spirit and scope of the invention.

The present invention has the advantage that data can be reliably written into a secure memory, and the present invention is useful as a secure device, etc. including a tamper-resistant area.

The invention claimed is:

1. A secure IC card used in an IC card system which receives data transmitted from a service terminal through a relay terminal having an information writing function, the secure IC card being a different device from the service terminal and relay terminal wherein communication links are established between the secure IC card, the service terminal and the relay terminal for performing data communications therebetween, the secure IC card comprising:

a tamper resistant module including at least one application, and a device control unit configured to control an operation of the secure IC card;

a secure memory which is accessible from only the tamper resistant module; and a communication unit configured to communicate with the service terminal after mutual authentication is performed between the secure IC card and the service terminal, wherein the device control unit, based on communications with the service terminal, generates and stores storage instruction information including an address of the secure memory that indicates a write area of the data, and information on a countermeasure for storing the data in a predetermined location in a case where the data cannot be written into the secure memory, the predetermined location being different from the secure memory and the data being encrypted before being stored in the predetermined location, and the communication unit transmits the storage instruction information to the service terminal and, upon notification that the secure memory is available for storing data, receives the data after being stored in the predetermined location when the data is able to be stored in the secure memory, wherein the information on the counter measure is determined based on 1) determination of a data transmission path; 2) verification of an empty storage area of the secure memory; 3) determination of an empty storage area of a normal memory; and 4) reservation of an empty storage area in the secure memory or the normal memory.

2. The secure IC card according to claim 1, wherein the information on the countermeasure includes an address of the normal memory of the secure device or the relay terminal that indicates a save area for temporarily saving the data and an identifier of the application which moves the data saved in the normal memory to the secure memory.

3. The secure IC card according to claim 2, wherein the information on the countermeasure includes a storage area reservation term indicating a term for which at least either the save area temporarily saves the data, or a memory area as the write area for the data is kept reserved.

4. The secure IC card according to claim 1, wherein
the communication unit receives attribute information of the data which is transmitted from the service terminal, and
the device control unit determines the relay terminal which relays the data to be transmitted from the service terminal, on the basis of the attribute information, and the device control unit includes an address of the determined relay terminal in the storage instruction information.

5. The secure IC card according to claim 1, wherein:
the communication unit receives attribute information of the data which is transmitted from the service terminal, and
the device control unit determines a communication method between the relay terminal and the service terminal, on the basis of the attribute information, and the device control unit includes the communication method in the storage instruction information.

6. A relay terminal used in an IC card system which writes data transmitted from a service terminal into a secure IC card configured to communicate with the relay terminal, the secure IC card being a different device from the service terminal and the relay terminal wherein communication links are established between the secure IC card, the service terminal and the relay terminal for performing data communications therebetween, the relay terminal comprising:
a data reception unit configured to receive from the service terminal, the data and storage instruction information, wherein the storage instruction information includes an address of a secure memory of the secure IC card that indicates a write area of the data, and information on a countermeasure for storing the data in a predetermined location in a case where the data cannot be written into the secure memory, the predetermined location being different from the secure memory and the data being encrypted before being stored in the predetermined location;
a command transmission unit configured to transmit a command for writing the received data into the address of the secure memory as designated by the storage instruction information, to the secure IC card, and for receiving a response to the command, from the secure IC card; and
a control unit for judging priority of the data to be written into the secure memory, on the basis of the response, and for writing the data into a normal memory of the secure IC card or the relay terminal as the predetermined location, on the basis of the information on the countermeasure designated by the storage instruction information, in case of a judgment that the writing of the data into the secure memory is not possible,
wherein the data after being stored in the predetermined location is written into the secure memory by the control unit upon notification that the secure memory is available for storing data and when the data is able to be stored in the secure memory,
wherein the information on the counter measure is determined based on 1) determination of a data transmission path; 2) verification of an empty storage area of the secure memory; 3) determination of an empty storage area of the normal memory; and 4) reservation of an empty storage area in the secure memory or the normal memory.

7. A relay terminal used in an IC card system which writes data transmitted from a service terminal into a secure IC card configured to be connected to the relay terminal, the secure IC card being a different device from the service terminal and the relay terminal, wherein communication links are established between the secure IC card, the service terminal and the relay terminal for performing data communications therebetween, the relay terminal comprising:
a data reception unit configured to receive from the service terminal, the data and storage instruction information that includes an address of a secure memory of the secure IC card that indicates a write area of the data, and information on a countermeasure for storing the data in a predetermined location in a case where the data cannot be written into the secure memory, the predetermined location being different from the secure memory and the data being encrypted before being stored in the predetermined location; and
a control unit configured to manage a processing state of the secure IC card to judge priority of the data to be written into the secure memory, on the basis of the processing state, and for writing the data into a normal memory of the secure IC card or the relay terminal as the predetermined location, on the basis of the information on the countermeasure designated by the storage instruction information, in case of a judgment that the writing of the data into the secure memory is not possible,
wherein the data after being stored in the predetermined location is written into the secure memory by the control unit upon notification that the secure memory is available for storing data and when the data is able to be stored in the secure memory, and
wherein the information on the counter measure is determined based on 1) determination of a data transmission path; 2) verification of an empty storage area of the secure memory; 3) determination of an empty storage area of the normal memory; and 4) reservation of an empty storage area in the secure memory or the normal memory.

8. The relay terminal according to claim 6, further comprising:
a deletion unit configured to delete the storage instruction information after completion of writing the data into the address of the normal memory designated by the storage instruction information.

9. The relay terminal according to claim 6, wherein the information on the countermeasure contains an address of the normal memory of the secure IC card or the relay terminal that indicates a save area for temporarily saving the data, and an identifier of an application for moving the data saved in the normal memory to the secure memory.

10. The relay terminal according to claim 9, wherein
the command transmission unit sends an activation command to the application corresponding to the application identifier, on the basis of the identifier of the application as designated by the storage instruction information, and
the command transmission unit sends to the activated application, a data movement command for moving the data temporarily saved in the normal memory to the address of the secure memory.

11. The relay terminal according to claim 7, wherein the information on the countermeasure contains an address of the normal memory of the secure IC card or the relay terminal that indicates a save area for temporarily saving the data, and an identifier of an application for moving the data saved in the normal memory to the secure memory.

12. The relay terminal according to claim 11, wherein the information on the countermeasure includes a storage area reservation term indicating a term for which at least either the save area temporarily saves the data or a memory area as the write area of the data is kept reserved.

13. The relay terminal according to claim 9, wherein
the command transmission unit sends an activation command to the application corresponding to the application identifier, on the basis of the identifier of the application as designated by the storage instruction information, and
the activated application moves the data temporarily saved in the normal memory, to the address of the secure memory, by referring to the storage instruction information.

14. The relay terminal according to claim 9, further comprising:
a data readout unit configured to access the address of the normal memory designated by the storage instruction information, so as to read out the data temporarily saved in the normal memory, wherein
the command transmission unit sends an activation command to the application corresponding to the application identifier, on the basis of the identifier of the application as designated by the storage instruction information, and
the command transmission unit sends to the activated application, a write command for instructing the application to write the data read out by the data readout unit into the address of the secure memory.

15. The relay terminal according to claim 12, wherein the command transmission unit deletes the data temporarily saved in the normal memory, by referring to the storage area reservation term designated by the storage instruction information.

16. A method of providing a secure IC card used in an IC card system wherein data transmitted from a service terminal is received through a relay terminal having an information writing function, the secure IC card being a different device from the service terminal and the relay terminal, wherein communication links are established between the secure IC card, the service terminal and the relay terminal for performing data communications therebetween, the method comprising:
generating storage instruction information including an address of a secure memory of the secure IC card that indicates a write area of the data, and information on a countermeasure for storing the data in a predetermined location in a case where the data cannot be written into the secure memory, the predetermined location being different from the secure memory and the data being encrypted before being stored in the predetermined location;
transmitting the storage instruction information to the service terminal after mutual authentication is performed between the secure IC card and the service terminal; and
receiving, after notification that the secure memory is available for storing data, the data after being stored in the predetermined location when the data is able to be stored in the secure memory,
wherein the information on the counter measure is determined based on 1) determination of a data transmission path; 2) verification of an empty storage area of the secure memory; 3) determination of an empty storage area of a normal memory; and 4) reservation of an empty storage area in the secure memory or the normal memory.

17. A program stored on a non-transitory computer-readable recording medium which serves to receive data transmitted from a service terminal through a relay terminal having an information writing function, and which is readable by a secure IC card used in an IC card system, the secure IC card being a different device from the service terminal and the relay terminal, wherein communication links are established between the secure IC card, the service terminal and the relay terminal for performing data communications therebetween, the program causing the secure IC card to execute steps comprising:
generating a storage instruction information including an address of a secure memory of the secure IC card that indicates a write area of the data, and information on a countermeasure for storing the data in a predetermined location in a case where the data cannot be written into the secure memory, the predetermined location being different from the secure memory and the data being encrypted before being stored in the predetermined location;
transmitting the storage instruction information to the service terminal after mutual authentication is performed between the secure IC card and the service terminal; and
receiving, after notification that the secure memory is available for storing data, the data after being stored in the predetermined location when the data is able to be stored in the secure memory,
wherein the information on the counter measure is determined based on 1) determination of a data transmission path; 2) verification of an empty storage area of the secure memory; 3) determination of an empty storage area of a normal memory; and 4) reservation of an empty storage area in the secure memory or the normal memory.

18. The relay terminal according to claim 7, further comprising:
a deletion unit configured to delete the storage instruction information after completion of writing the data into the address of the normal memory designated by the storage instruction information.

19. The relay terminal according to claim 11, wherein
the command transmission unit sends an activation command to the application corresponding to the application identifier, on the basis of the identifier of the application as designated by the storage instruction information, and
the activated application moves the data temporarily saved in the normal memory, to the address of the secure memory, by referring to the storage instruction information.

20. The relay terminal according to claim 11, further comprising:
a data readout unit configured to access the address of the normal memory designated by the storage instruction information, so as to read out the data temporarily saved in the normal memory, wherein
the command transmission unit sends an activation command to the application corresponding to the application identifier, on the basis of the identifier of the application as designated by the storage instruction information, and
the command transmission unit sends to the activated application, a write command for instructing the application to write the data read out by the data readout unit into the address of the secure memory.

* * * * *